US011206050B2

(12) United States Patent
Luo et al.

(10) Patent No.: US 11,206,050 B2
(45) Date of Patent: Dec. 21, 2021

(54) SELF INTERFERENCE NOISE CANCELLATION TO SUPPORT MULTIPLE FREQUENCY BANDS

(71) Applicant: MICRON TECHNOLOGY, INC., Boise, ID (US)

(72) Inventors: Fa-Long Luo, San Jose, CA (US); Jaime Cummins, Bainbridge Island, WA (US); Tamara Schmitz, Scotts Valley, CA (US); Jeremy Chritz, Seattle, WA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/890,275

(22) Filed: Feb. 6, 2018

(65) Prior Publication Data
US 2019/0245565 A1 Aug. 8, 2019

(51) Int. Cl.
*H04W 72/08* (2009.01)
*H04B 1/04* (2006.01)
(Continued)

(52) U.S. Cl.
CPC .......... *H04B 1/0475* (2013.01); *H04B 1/525* (2013.01); *H04L 5/14* (2013.01)

(58) Field of Classification Search
CPC ......... H04L 25/08; H04L 5/14; H04B 17/345; H04B 7/04
See application file for complete search history.

(56) References Cited

U.S. PATENT DOCUMENTS 5,377,108 A 12/1994 Nishio
6,515,978 B1 2/2003 Buehrer et al.
(Continued)

FOREIGN PATENT DOCUMENTS

CN 101563851 A 10/2009
CN 104468055 A 3/2015
(Continued)

OTHER PUBLICATIONS

U.S. Appl. No. 16/105,915 titled "Wireless Devices and Systems Including Examples of Full Duplex Transmission", filed Aug. 20, 2018. pp. all.
(Continued)

*Primary Examiner* — Sithu Ko
(74) *Attorney, Agent, or Firm* — Dorsey & Whitney LLP

(57) ABSTRACT

Examples described herein include systems and methods which include wireless devices and systems with examples of full duplex compensation with a self-interference noise calculator that compensates for the self-interference noise generated by power amplifiers at harmonic frequencies of a respective wireless receiver. The self-interference noise calculator may be coupled to antennas of a wireless device and configured to generate the adjusted signals that compensate self-interference. The self-interference noise calculator may include a network of processing elements configured to combine transmission signals into sets of intermediate results. Each set of intermediate results may be summed in the self-interference noise calculator to generate a corresponding adjusted signal. The adjusted signal is receivable by a corresponding wireless receiver to compensate for the self-interference noise generated by a wireless transmitter transmitting on the same or different frequency band as the wireless receiver is receiving.

24 Claims, 13 Drawing Sheets

(51) Int. Cl.
*H04L 5/14* (2006.01)
*H04B 1/525* (2015.01)

(56) References Cited

U.S. PATENT DOCUMENTS

| | | | |
|---|---|---|---|
| 6,765,495 B1 | 7/2004 | Dunning et al. | |
| 7,965,990 B2* | 6/2011 | Luz | H03F 3/189 |
| | | | 455/103 |
| 9,147,353 B1 | 9/2015 | Slusar | |
| 9,172,441 B2* | 10/2015 | Granger-Jones | H04B 1/006 |
| 9,391,680 B2 | 7/2016 | Le-Ngoc et al. | |
| 10,050,663 B1 | 8/2018 | Ku et al. | |
| 10,070,432 B1 | 9/2018 | Luo et al. | |
| 10,142,137 B2 | 11/2018 | Luo et al. | |
| 10,554,375 B2 | 2/2020 | Luo et al. | |
| 10,778,403 B2 | 9/2020 | Luo et al. | |
| 10,805,128 B2 | 10/2020 | Luo et al. | |
| 10,880,132 B1 | 12/2020 | Mirfakhraei et al. | |
| 10,924,139 B2* | 2/2021 | Cong | H04B 1/401 |
| 2002/0155821 A1* | 10/2002 | Louis | H03F 1/3229 |
| | | | 455/115.1 |
| 2005/0060069 A1 | 3/2005 | Breed et al. | |
| 2005/0078615 A1 | 4/2005 | Muri | |
| 2006/0162985 A1 | 7/2006 | Tanaka et al. | |
| 2007/0160014 A1 | 7/2007 | Larsson | |
| 2008/0117411 A1* | 5/2008 | Vuong | G01N 21/4788 |
| | | | 356/73 |
| 2009/0180404 A1* | 7/2009 | Jung | H04B 7/15585 |
| | | | 370/279 |
| 2009/0233555 A1* | 9/2009 | Nakamura | H04B 1/126 |
| | | | 455/63.1 |
| 2009/0316842 A1 | 12/2009 | Lu et al. | |
| 2010/0027688 A1 | 2/2010 | Suh et al. | |
| 2010/0191391 A1 | 7/2010 | Zeng | |
| 2011/0106442 A1 | 5/2011 | Desai et al. | |
| 2011/0171922 A1* | 7/2011 | Kim | H04B 1/525 |
| | | | 455/307 |
| 2012/0170619 A1 | 7/2012 | Chang et al. | |
| 2012/0300680 A1 | 11/2012 | Pietsch et al. | |
| 2013/0158852 A1 | 6/2013 | Stahlin et al. | |
| 2014/0003264 A1 | 1/2014 | Shin | |
| 2014/0056229 A1 | 2/2014 | Li et al. | |
| 2014/0169236 A1 | 6/2014 | Choi et al. | |
| 2014/0219139 A1 | 8/2014 | Choi et al. | |
| 2015/0018043 A1* | 1/2015 | Taniuchi | H03H 7/38 |
| | | | 455/561 |
| 2015/0043323 A1 | 2/2015 | Choi et al. | |
| 2015/0055568 A1 | 2/2015 | Jindal et al. | |
| 2015/0085944 A1* | 3/2015 | Mobasher | H04B 7/0413 |
| | | | 375/267 |
| 2015/0140926 A1 | 5/2015 | Fujio et al. | |
| 2015/0244436 A1 | 8/2015 | Le-ngoc et al. | |
| 2016/0036504 A1 | 2/2016 | Khojastepour et al. | |
| 2016/0036582 A1 | 2/2016 | Jana et al. | |
| 2016/0226535 A1 | 8/2016 | Choi et al. | |
| 2016/0226653 A1 | 8/2016 | Bharadia et al. | |
| 2016/0233903 A1 | 8/2016 | Wu et al. | |
| 2017/0091953 A1 | 3/2017 | Bleiweiss et al. | |
| 2017/0104576 A1* | 4/2017 | Liu | H04B 1/711 |
| 2017/0131719 A1 | 5/2017 | Micks et al. | |
| 2017/0150481 A1 | 5/2017 | Gupta et al. | |
| 2017/0237547 A1 | 8/2017 | Eltawil et al. | |
| 2017/0257180 A1 | 9/2017 | Aggarwal et al. | |
| 2017/0273090 A1* | 9/2017 | Jung | H04W 72/0493 |
| 2018/0006690 A1 | 1/2018 | Shepard et al. | |
| 2018/0076947 A1* | 3/2018 | Kazakevich | H04L 5/1461 |
| 2018/0123683 A1 | 5/2018 | Wakabayashi et al. | |
| 2018/0152330 A1 | 5/2018 | Chritz et al. | |
| 2018/0206176 A1 | 7/2018 | Panteleev et al. | |
| 2018/0254930 A1* | 9/2018 | Luo | H04B 1/123 |
| 2018/0278290 A1 | 9/2018 | Moorti et al. | |
| 2018/0302048 A1* | 10/2018 | Donoghue | H03F 3/19 |
| 2018/0309526 A1 | 10/2018 | Zhang et al. | |
| 2019/0007242 A1 | 1/2019 | Luo et al. | |
| 2019/0020381 A1 | 1/2019 | Tooher et al. | |
| 2019/0027824 A1* | 1/2019 | Pajona | H01Q 21/00 |
| 2019/0028260 A1 | 1/2019 | Karlsson et al. | |
| 2019/0065945 A1 | 2/2019 | Luo et al. | |
| 2019/0065951 A1 | 2/2019 | Luo et al. | |
| 2019/0081766 A1 | 3/2019 | Luo et al. | |
| 2019/0081767 A1 | 3/2019 | Luo et al. | |
| 2019/0123442 A1* | 4/2019 | Vannucci | H01Q 3/40 |
| 2019/0229884 A1* | 7/2019 | Xue | H04B 1/48 |
| 2019/0245566 A1 | 8/2019 | Luo et al. | |
| 2020/0127803 A1 | 4/2020 | Luo et al. | |
| 2020/0205156 A1* | 6/2020 | Adjakple | H04W 74/0833 |
| 2020/0358177 A1 | 11/2020 | Ge et al. | |
| 2020/0366538 A1 | 11/2020 | Luo et al. | |
| 2020/0405204 A1 | 12/2020 | Howard | |
| 2020/0412518 A1 | 12/2020 | Luo et al. | |
| 2021/0075464 A1 | 3/2021 | Luo | |
| 2021/0275050 A1 | 9/2021 | Ren et al. | |
| 2021/0320678 A1 | 10/2021 | Luo | |

FOREIGN PATENT DOCUMENTS

| | | | |
|---|---|---|---|
| CN | 104539341 A | | 4/2015 |
| CN | 105075157 A | | 11/2015 |
| CN | 105594131 A | | 5/2016 |
| CN | 106301419 A | | 1/2017 |
| CN | 107124245 A | | 9/2017 |
| CN | 110383720 A | | 10/2019 |
| DE | 102015015021 A1 | | 5/2016 |
| EP | 1164758 A2 | | 12/2001 |
| JP | 2016529837 A | | 9/2016 |
| KR | 20070116736 A | | 12/2007 |
| KR | 20100095650 A | | 8/2010 |
| KR | 20130132817 A | | 12/2013 |
| KR | 20160090372 A | | 7/2016 |
| KR | 20160127099 A | | 11/2016 |
| KR | 20190091818 A | | 8/2019 |
| WO | 2004095625 A2 | | 11/2004 |
| WO | 2016111638 A1 | | 7/2016 |
| WO | 2016154219 A1 | | 9/2016 |
| WO | 2017026970 A1 | | 2/2017 |
| WO | 2017069300 A1 | | 4/2017 |
| WO | 2017121487 A1 | | 7/2017 |
| WO | 2019046103 A1 | | 3/2019 |
| WO | 2019050980 A1 | | 3/2019 |
| WO | 2021211560 A1 | | 10/2021 |

OTHER PUBLICATIONS

U.S. Appl. No. 16/113,995 titled "Self Interference Noise Cancellation to Support Multiple Frequency Bands"; filed Aug. 27, 2018, pp. all.
U.S. Appl. No. 16/114,923 titled "Cooperative Learning Neural Networks and Systems" filed Aug. 28, 2018, pp. all.
U.S. Appl. No. 16/116,365 titled "Full Duplex Device-To-Device Cooperative Communication" filed Aug. 29, 2018, pp. all.
U.S. Appl. No. 15/693,142, entitled "Cooperative Learning Neural Networks and System", filed Aug. 31, 2017, pp. all.
U.S. Appl. No. 15/701,007 entitled "Full Duplex Device-To-Device Cooperative Communication" filed Sep. 11, 2017, pp. all.
U.S. Appl. No. 15/447,731 entitled "Wireless Devices and Systems Including Examples of Full Duplex Transmission", filed Mar. 2, 2017, pp. all.
International Search Report and Written Opinion for PCT Application No. PCT/US2019/014897 dated May 20, 2019; pp. all.
U.S. Appl. No. 16/561,868 titled "Wireless Devices and Systems Including Examples of Full Duplex Transmission Using Neural Networks or Recurrent Neural Networks" filed Sep. 5, 2019, pp. all.
U.S. Appl. No. 16/718,930 titled "Full Duplex Device-To-Device Cooperation Communication", filed Dec. 18, 2019.
Anttila, Lauri et al., "Modeling and Efficient Cancellation of Nonlinear Self-Interference in MIMO Full-Duplex Transceivers", IEEE Globecom Workshops, Dec. 2014, 7 pgs.
Geevarghese, Biju et al., "CDMA Interferance Cancellation Techniques Using Neural Networks in Rayleigh Channels", IEEE: International Conference on Information Communication and Embedded Systems (ICICES), Feb. 2013, 5 pgs.

(56) References Cited

OTHER PUBLICATIONS

Chang, Bao Rong et al. "Simulation for Implementation of High-Performance Collision Warning System for Motor Behicle Safety Using Embedded ANFIS Prediction"; 3rd International Conference on Innovative Computing Information and Control (ICICIC '08); IEEE; 2008, pp. all.

Kim, Seunghyeon et al. "Transfer Learning for Automated Optical Inspection"; 2017 International Conference on Neural Networks (IJCNN), Jul. 3, 2017; pp. all.

Young, Chung-Ping et al. "Highway Vehicle Accident Reconstruction Using Cooperative Collision Warning Based Motor Vehicle Event Data Recorder"; IEEE, 2009, pp. all.

Chen, C. et al. "A rear-end collision prediction scheme based on deep learning in the Internet of Vehicles"; J. Parallel Distribut. Comput.; Elsevier, 2017, pp. all.

Kang, M. et al. "Intrusion Detection System Using Deep Neural Network for In-Vehicle Network Security"; Research Article; The Department of Electronics Engineering, Ewha W. University, Seoul, Republic of Korea, Jun. 7, 2016, pp. all.

U.S. Appl. No. 16/848,514 titled "Self Interference Noise Cancellation to Support Multiple Frequency Bands With Neural Networks or Recurrent Neural Networks" filed Apr. 14, 2020, pp. all.

U.S. Appl. No. 16/983,797 titled "Wireless Devices and Systems Including Examples of Full Duplex Transmission" filed Aug. 3, 2020, pp. all.

U.S. Appl. No. 17/018,256 titled "Full Duplex Device-To-Device Cooperative Communication" filed Sep. 11, 2020, pp. all.

U.S. Appl. No. 17/224,962 titled "Wireless Devices and Systems Including Examples of Full Duplex Transmission Using Neural Networks or Recurrent Neural Networks" filed Apr. 7, 2021.

Anttila, Lauri et al., "Modeling and Efficient Cancellation of Nonlinear Self-Interference in MIMO Full-Duplex Transceivers", IEEE, Oct. 2014, 7 pgs.

Zhang, Zhongshan et al., "Full Duplex Techniquest for 5G Networks: Self-Interference Cancellation, Protocol Design, and Relay Selection", IEEE Communications Magazine, May 2015, 10 pgs.

Kehtarnavaz, et al., A Transportable Neural-Network Approach to Autonomous Vehicle Following, IEEE Transactions on Vehicular Technology, vol. 47. No. 2, May 1998 (Year: 1998).

Office Action for CN Application No. 201980011797.6, dated Jun. 28, 2021, pp. all.

Kristensen, Toftegaard A. et al., "Advanced Machine Learning Techniques for Self-Interference Cancellation in Full-Duplex Radios", 53rd Asilomar Conference on Signals, Systems, and Computers, Date of Conference: Nov. 3-6, 2019, pp. 1-5.

Sulaiman, Ahmed et al., "Elman Recurrent Neural Network Application in Adaptive Beamforming of Smart Antenna System", International Journal of Computer Applications (0975-8887), vol. 129, No. 11, Nov. 2015, pp. 38-43.

Tarver, Chance et al., "Neural Network DPD via Backpropagation Through Neural Network Model of the PA", 53rd Asilomar Conference on Signals, Systems, and Computers, Date of Conference: Nov. 3-6, 2019, pp. 1-5 and figure 4.

Wang, Li, "Exploiting Full Duplex for Device-to-Device Communications in Heterogeneous Networks", IEEE Communications Magazine, May 2015, pp. all.

English translation of Office Action for KR Application No. 10-2020-7025370, dated Sep. 16, 202.

Extended European Search Report for EP Application No. 19751566.1, dated Oct. 13, 2021.

\* cited by examiner

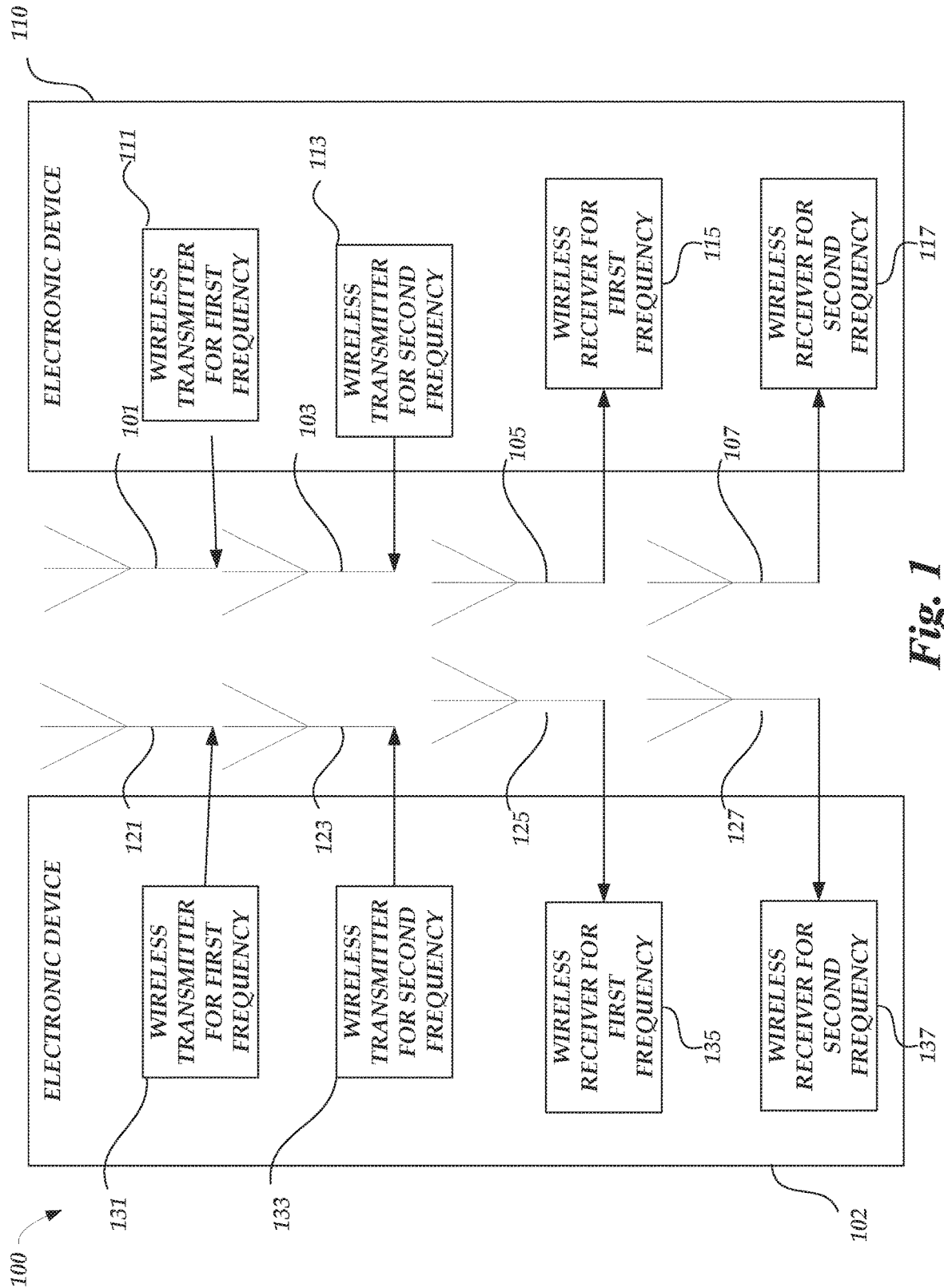

SELF INTERFERENCE NOISE CANCELLATION TO SUPPORT MULTIPLE FREQUENCY BANDS

BACKGROUND

There is a great interest in moving wireless communications to "fifth generation" (5G) systems. 5G promises increased speed and ubiquity, but methodologies for processing 5G wireless communications have not yet fully been set. Example 5G systems may be implemented using multiple-input multiple-output (MIMO) techniques, including "massive MIMO" techniques, in which multiple antennas (more than a certain number, such as 8 in the case of example MIMO systems) are utilized for transmission and/or receipt of wireless communication signals.

BRIEF DESCRIPTION OF THE DRAWINGS

FIG. 1 is a schematic illustration of a system arranged in accordance with examples described herein.

DETAILED DESCRIPTION

Figure 2A:
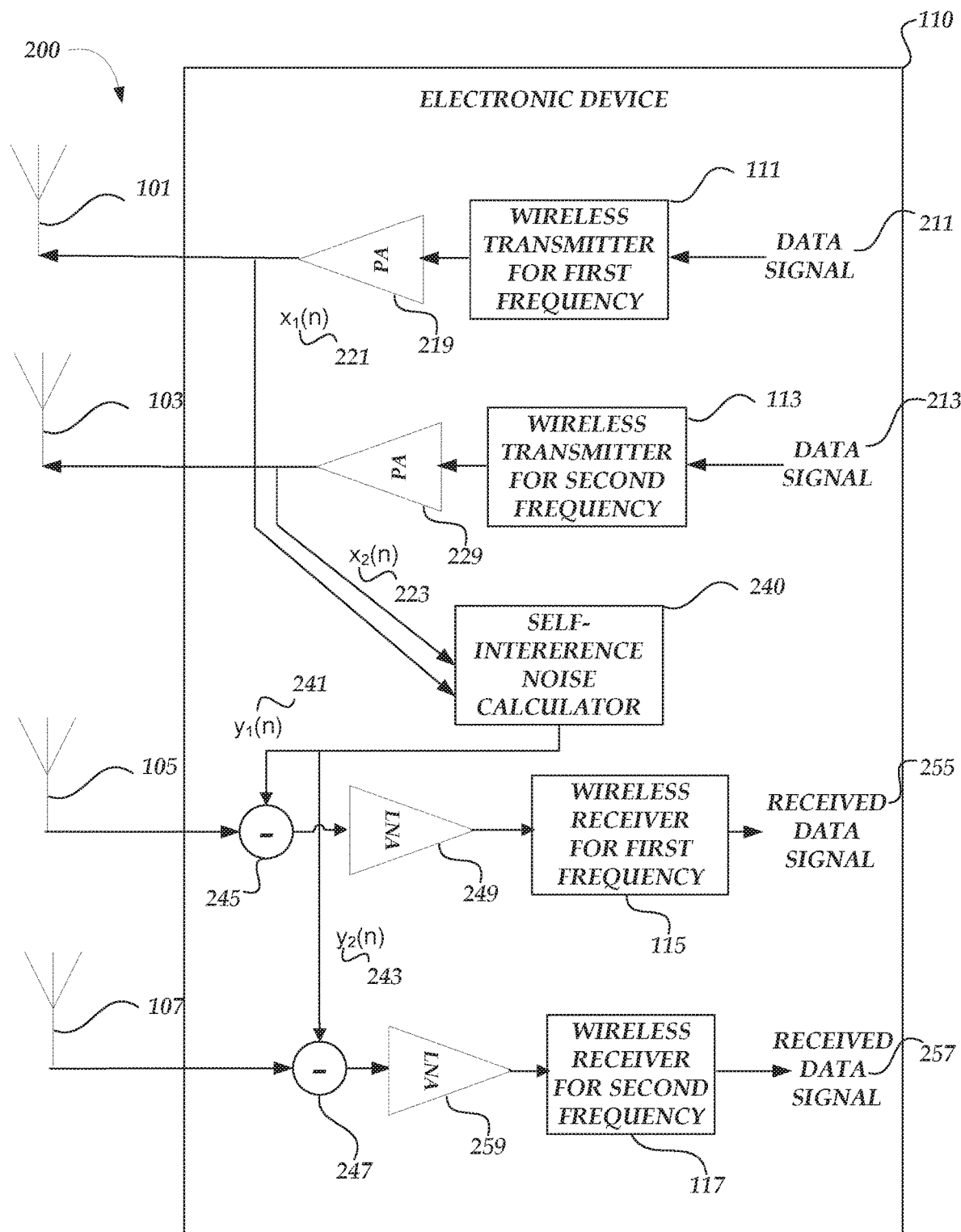
FIG. 2A is a schematic illustration of an electronic device arranged in accordance with examples described herein.

Certain details are set forth below to provide a sufficient understanding of embodiments of the present disclosure. However, it will be clear to one skilled in the art that embodiments of the present disclosure may be practiced without various of these particular details. In some instances, well-known wireless communication components, circuits, control signals, timing protocols, computing system components, telecommunication components, and software operations have not been shown in detail in order to avoid unnecessarily obscuring the described embodiments of the present disclosure.

Full duplex communication may be desirable for a variety of devices. Full duplex communication generally may refer to an ability to both send and receive transmissions, in some cases simultaneously and/or partially simultaneously. In examples of systems employing full duplex communication, it may be desirable to cancel interference generated by other antennas in the system. Moreover, full duplex communication may be desirable on devices that employ multiple frequency bands, including separate frequency bands for different communication protocols.

Examples described herein may compensate for interference generated by other antennas co-located on the same physical device or system (e.g., interference created by an antenna on a MIMO device). For example, a transmitting antenna may generate interference for nearby receiving antennas, including one or more antennas which may be co-located on a same physical device or system. The transmitting antenna may generate energy at the transmitting frequency and also at harmonics of the transmitting frequency. Accordingly, receiving systems sensitive to the transmitting frequency or harmonics of the transmitting frequency may be particularly susceptible to interference from the transmitting antenna in some examples.

Moreover, nonlinear power amplifiers, which are frequently employed in transmitters and/or transceivers of wireless communication systems, may contribute to creation of interference at harmonics of the transmitting frequency. For example, a nonlinear power amplifier may create power amplifier noise that interferes with a frequency band that is twice or three times the frequency to be amplified (e.g., the transmitting frequency). Multiples of the frequency to be amplified may be referred to as harmonic frequencies. Accordingly, a frequency that is twice the frequency to be amplified may be referred to as a second-order harmonic ($2f_0$); and a frequency that is thrice the frequency to be amplified, a third-order harmonic ($3f_0$), where $f_0$ is the frequency to be amplified. Such harmonic frequency components may be introduced into transmitted signals by the power amplifier, which may generate energy at the harmonic frequencies due in part to the nonlinear characteristics of the power amplifier.

Such nonlinear characteristics of the power amplifier may also introduce other nonlinear components into transmitted signals, for example, if more than one frequency is involved in the data signal (e.g., a data signal to be transmitted) when provided to the power amplifier. For example, if an additional frequency $f_1$ is also to be amplified in conjunction with $f_0$, additional frequency components may be introduced by power amplifier noise into the transmitted signals at varying frequencies representing combinations of the frequencies to be amplified and/or their harmonics, such as $f_0-f_1$, $2f_0-f_1$, and $3f_1-f_1$. For example, in a mathematical representation, non-linear characteristics or additional frequency components may be incorporated into a model of power amplifier behavior as harmonic components added into the amplified response of a data signal at a particular frequency, with the harmonic components and additional frequency components being related to that particular frequency.

In the example of full duplexing (FD), an antenna transmitting a transmission on a certain frequency band may create interference for a nearby antenna (e.g., an antenna co-located on the same device), which may be intended to receive a transmission on a different frequency band. Such interference may be referred to as self-interference. Self-interference may disrupt the accuracy of signals transmitted or received by the MIMO device. Examples described herein may compensate for self-interference at an electronic device, which may aid in achieving full duplex transmission. A network of processing elements may be used to generate adjusted signals to compensate for self-interference generated by the antennas of the electronic device.

5G systems may advantageously make improved usage of additional frequency bands, for example, to improve spectrum efficiency. Frequency bands in some systems may be assigned by regulatory authorities such as the Federal Communication Commission (FCC). Assignments may be made, for example, according to different applications such as digital broadcasting and wireless communication. These licensed and assigned frequencies may be inefficiently used if there is simply time-division duplex (TDD), frequency-division duplex (FDD) or half-duplex FDD mode, which are duplexing modes often used in existing wireless applications. Such modes may not be acceptable when improved efficiency is demanded from the wireless spectrum.

Moreover, with the fast development of digital transmission and communications, there are fewer and fewer unlicensed frequency bands, and it may be advantageous to use those licensed frequency bands in a full duplex transmission mode (e.g., transmitting and receiving on multiple frequency bands). For example, the FCC has officially proposed to open a frequency range around or about 3.5 GHz. Moreover, some 5G standards specify that such new frequency bands are to be utilized in conjunction with existing frequency bands (e.g., 4G frequency bands). Examples described herein may be utilized to achieve full duplex transmission in some examples on multiple frequency bands including the aforementioned frequency ranges.

In some examples described herein, a wireless device or system may transmit and receive on this new narrowband frequency range, while also transmitting and receiving on other frequency bands, such as legacy frequency bands at 4G frequency bands (e.g., 1.8 GHz) or other 5G frequency bands. For example, a wireless device may include a transceiver system for 5G wireless communications intended to transmit and receive at 3.5 GHz referred to as the New Radio (NR) Band), and another transceiver system for 4G wireless communications intended to transmit and receive at 1.8 GHz (e.g., referred to as the Long-Term Evolution (LTE) band). Full-duplex (FD) transmission may allow such a wireless communication system to transmit and receive the signals, at least partially simultaneously, on different frequency bands. This may allow FD 5G systems to interoperate with other frequency bands.

Examples described herein include systems and methods which include wireless devices and systems with a self-interference noise calculator. The self-interference noise calculator may be or include circuitry, and may utilize a network of processing elements to generate a corresponding adjusted signal corresponding to self-interference that an antenna at a specific frequency band of the wireless device or system is expected to experience due to transmission signals at a different frequency band from another antenna of the wireless device or system. Such a network of processing elements may combine transmission signals to provide intermediate processing results that are summed, based on respective weights, to generate adjusted signals. A respective weight vector applied to the intermediate processing result may be based on an amount of interference expected for the respective transmission signal from the corresponding intermediate processing result.

In some examples, a self-interference noise calculator may include bit manipulation units, multiplication processing units, and/or accumulation processing units. For example, the multiplication processing units may weight the intermediate processing results based on a minimized error for all or some of the adjustment signals that may generated by a self-interference noise calculator. In minimizing the error for the adjustment signals, a wireless device or system may achieve full duplex transmission on multiple frequency bands utilizing the self-interference noise calculator.

FIG. 1 is a schematic illustration of a system arranged in accordance with examples described herein. System 100 includes electronic device 102, electronic device 110, antenna 101, antenna 103, antenna 105, antenna 107, antenna 121, antenna 123, antenna 125, antenna 127, wireless transmitter 131, wireless transmitter 133, wireless receiver 135 and, wireless receiver 137. Antennas 101, 103, 105, 107, 121, 123, 125, and 127 may be dynamically tuned to different frequencies or bands, in some examples. The electronic device 102 may include antenna 121 associated with a first frequency, antenna 123 associated with a second frequency, antenna 125 associated with the first frequency, antenna 127 associated with the second frequency, wireless transmitter 131 for the first frequency, wireless transmitter 133 for the second frequency, wireless receiver 135 for the first frequency, and wireless receiver 137 the second frequency. The electronic device 110 may include the antenna 101 associated with the first frequency, antenna 103 associated with the second frequency, antenna 105 associated with the first frequency, antenna 107 associated with the second frequency, wireless transmitter 111 for the first frequency, wireless transmitter 113 for the second frequency, wireless receiver 115 for the first frequency, and wireless receiver 117 the second frequency.

In operation, electronic devices 102, 110 can operate in a full duplex transmission mode between the respective antennas of each electronic device. In an example of a full duplex transmission mode, on a first frequency band, wireless transmitter 131 coupled to antenna 121 may transmit to antenna 105 coupled to wireless receiver 115; while, at the same time or during at least a portion of a common time period, on a second frequency band, wireless transmitter 113 coupled to antenna 103 may transmit to antenna 127 coupled to wireless receiver 137, in some examples. Self-interference received by antenna 127 or antenna 105 from the respective transmissions at antenna 121 and antenna 103 may be at least partially compensated by the systems and methods described herein. Self-interference may generally refer to any wireless interference generated by transmissions from antennas of an electronic device to signals received by other antennas, or same antennas, on that same electronic device.

The electronic device 102 can receive self-interference noise associated with the first frequency from antenna 121 on a wireless path from the antenna 121 to the antenna 127. The self-interference noise received at the antenna 127 may be interference generated at frequencies based on the first frequency transmitted by the antenna 121 and/or one or more harmonics of the first frequency transmitted by the antenna 121. Similarly, the electronic device 110 can receive self-interference noise at the antenna 107 associated with the second frequency from antenna 103 on a wireless path from the antenna 103 to the antenna 107. The self-interference noise received at the antenna 107 may be interference generated by frequencies based on the same, second frequency transmitted by the antenna 103. While the antennas 127 and 107 may not be receiving wireless transmission from electronic devices 102, 110 in this example, the antennas 127, 107 may be receiving wireless transmission signals from other electronic devices in system 100, such that the self-interference noise received at antennas 127, 107 may degrade the reception of such signals. With the systems and methods described herein, such self-interference noise may be compensated for so that the respective wireless receivers 137, 117 may experience improved ability to receive their desired signals.

In some examples of the full duplex transmission mode, on a first frequency band, wireless transmitter 131 coupled to antenna 121 may transmit to antenna 105 coupled to wireless receiver 115; while, at the same time or during at least a portion of the same time, on a second frequency band, wireless transmitter 133 coupled to antenna 123 may transmit to antenna 107 coupled to wireless receiver 117, in some examples. Antenna 127 may accordingly have incident energy from transmissions from the antenna 121 at the first frequency and related frequencies (e.g., harmonics) and incident energy from transmissions from the antenna 123 at the second frequency and related frequencies (e.g., harmonics). The incident energy from the antennas 121 and 123 may in some examples be sufficiently close to the intended receive frequency at the antenna 127 that they interfere with transmissions intended to be received by the antenna 127. Similarly, antenna 125 may have incident energy at the first frequency and related frequencies from the antenna 121 and at the second frequency and related frequencies from the antenna 123.

However, in some examples, the energy at least second frequency and related frequencies from the antenna 123 may not be sufficiently close to (e.g., within the sensitivity of the receiver) the intended receive frequency of the antenna 125. Note also that the antennas 127 and 125 may be, at least partially simultaneously during transmission of signals from antennas 121 and 123, receiving wireless transmissions from electronic device 110 or another electronic device in system 100, such that the energy from other antennas incident at antennas 127, 125 may degrade the reception of such signals. With the systems and methods described herein, such self-interference noise may be at least partially compensated so that the respective wireless receivers 137, 135 may have improved reception of the intended transmissions.

Electronic devices described herein, such as electronic device 102 and electronic device 110 shown in FIG. 1 may be implemented using generally any electronic device for which communication capability is desired. For example, electronic device 102 and/or electronic device 110 may be implemented using a mobile phone, smartwatch, computer (e.g. server, laptop, tablet, desktop), or radio. In some examples, the electronic device 102 and/or electronic device 110 may be incorporated into and/or in communication with other apparatuses for which communication capability is desired, such as but not limited to, a wearable device, a medical device, an automobile, airplane, helicopter, appliance, tag, camera, or other device.

While not explicitly shown in FIG. 1, electronic device 102 and/or electronic device 110 may include any of a variety of components in some examples, including, but not limited to, memory, input/output devices, circuitry, processing units (e.g. processing elements and/or processors), or combinations thereof.

The electronic device 102 and the electronic device 110 may each include multiple antennas. For example, the electronic device 102 and electronic device 110 may each have more than two antennas. Three antennas each are shown in FIG. 1, but generally any number of antennas may be used including 2, 3, 4, 5, 6, 7, 8, 9, 10, 11, 12, 13, 14, 15, 16, 32, or 64 antennas. Other numbers of antennas may be used in other examples. In some examples, the electronic device 102 and electronic device 110 may have a same number of antennas, as shown in FIG. 1. In other examples, the electronic device 102 and electronic device 110 may have different numbers of antennas.

Generally, systems described herein may include multiple-input, multiple-output ("MIMO") systems. MIMO systems generally refer to systems including one or more electronic devices which transmit transmissions using multiple antennas and one or more electronic devices which receive transmissions using multiple antennas. In some examples, electronic devices may both transmit and receive transmissions using multiple antennas. Some example systems described herein may be "massive MIMO" systems. Generally, massive MIMO systems refer to systems employing greater than a certain number (e.g. 8) antennas to transmit and/or receive transmissions. As the number of antennas increase, so generally does the complexity involved in accurately transmitting and/or receiving transmissions.

Although two electronic devices (e.g. electronic device 102 and electronic device 110) are shown in FIG. 1, generally the system 100 may include any number of electronic devices.

Electronic devices described herein may include receivers, transmitters, and/or transceivers. For example, the electronic device 102 of FIG. 1 includes wireless transmitter 131 and wireless receiver 135, and the electronic device 110 includes wireless transmitter 111 and wireless receiver 115. Generally, receivers may be provided for receiving transmissions from one or more connected antennas, transmitters may be provided for transmitting transmissions from one or more connected antennas, and transceivers may be provided for receiving and transmitting transmissions from one or more connected antennas. While both electronic devices 102, 110 are depicted in FIG. 1 with individual wireless transmitter and individual wireless receivers, it can be appreciated that a wireless transceiver may be coupled to antennas of the electronic device and operate as either a wireless transmitter or wireless receiver, to receive and transmit transmissions. For example, a transceiver of electronic device 102 may be used to provide transmissions to and/or receive transmissions from antennas 121 and 123, while other transceivers of electronic device 110 may be used to provide transmissions to and/or receive transmissions from antenna 101 and antenna 103.

Generally, multiple receivers, transmitters, and/or transceivers may be provided in an electronic device one in communication with each of the antennas of the electronic device. The transmissions may be in accordance with any of a variety of protocols, including, but not limited to 5G signals, and/or a variety of modulation/demodulation schemes may be used including, but not limited to: orthogonal frequency division multiplexing (OFDM), filter bank multi-carrier (FBMC), the generalized frequency division multiplexing (GFDM), universal filtered multi-carrier (UFMC) transmission, bi orthogonal frequency division multiplexing (BFDM), sparse code multiple access (SOMA), non-orthogonal multiple access (NOMA), multi-user shared access (MUSA) and faster-than-Nyquist (FTN) signaling with time-frequency packing. In some examples, the transmissions may be sent, received, or both, in accordance with various protocols and/or standards (e.g., NR, LTE, WiFi, etc.).

Examples of transmitters, receivers, and/or transceivers described herein, such as the wireless transmitter 131, wireless transmitter 133, wireless receiver 115, or wireless receiver 117, may be implemented using a variety of components, including, hardware, software, firmware, or combinations thereof. For example, transceivers, transmitters, or receivers may include circuitry and/or one or more processing units (e.g. processors) and memory encoded with executable instructions for causing the transceiver to perform one or more functions described herein (e.g. software).

FIG. 2A is a schematic illustration 200 of an electronic device 110 arranged in accordance with examples described herein. The electronic device 110 may also include self-interference noise calculator 240, compensation component 245, and compensation component 247. Each wireless transmitter 111, 113 may be in communication with a respective antenna, such as antenna 101, antenna 103 via respective power amplifiers, such as power amplifiers 219, 229. Each wireless transmitter 111, 113 receives a respective data signal, such as data signals 211, 213. The wireless transmitters 111, 113 may process the data signals 211, 213 with the operations of a radio-frequency (RF) front-end and in conjunction with the power amplifiers 219, 229 generate amplified signals $x_1(n)$, $x_2(n)$ 221, 223.

The amplified data signals $x_1(n)$ 221 and $x_2(n)$ 223 are provided in the electronic device 110 to the self-interference noise calculator 240. For example, the amplified data signals $x_1(n)$, $x_2(n)$ 221, 223 may be provided to the self-interference noise calculator 240 via an internal path from an output of a respective power amplifier 219, 229, Accordingly, output paths of the wireless transmitters 111, 113 and the self-interference noise calculator 240 may be in communication with one another. The self-interference noise calculator 240, therefore, receives a first amplified data signal $x_1(n)$ 221 associated with a first frequency from the wireless transmitter 111 for the first frequency and the power amplifier 219; and, a second amplified data signal $x_2(n)$ 223 associated with the second frequency from the wireless transmitter 113 for the second frequency and the power amplifier 229.

Self-interference noise calculator 240 and compensation components 245, 247 may be in communication with one another. Each wireless receiver may be in communication with a respective antenna via a receiver path of the respective wireless receivers 115, 117, such as antenna 105, 107 via a respective compensation component, such as compensation component 245, 247, and respective low-noise amplifiers (LNA) 249, 259. In some examples, a wireless transmission received at antennas 105, 107 may be communicated to wireless receiver 115, 117 after compensation of self-interference by the respective compensation component 245, 247 and amplification of the compensated, received signal by LNAs 249, 259. Each wireless receiver 115, 117 processes the received compensated, and amplified wireless transmission to produce a respective received data signal, such as received data signals 255, 257. In other examples, fewer, additional, and/or different components may be provided.

Examples of self-interference noise calculators described herein may generate and provide adjusted signals to compensation components. So, for example, the self-interference noise calculator 240 may generate adjusted signals $y_1(n)$ 241 and $y_2(n)$ 243 and provide such adjusted signals to the compensation components 245, 247. The self-interference noise calculator 240 may generate such adjusted signals $y_1(n)$, $y_2(n)$ 241, 243 according to the amplified data signals $x_1(n)$, $x_2(n)$ 221, 223. The self-interference noise calculator 240 may be in communication with multiple (e.g. all) wireless transmitters paths of the electronic device 110 and all the respective compensation components coupled to respective wireless receivers, and may provide adjusted signals based on transmitter output data signals and/or amplifier output data signals, such as amplified data signals $x_1(n)$, $x_2(n)$ 221, 223.

It may be desirable in some examples to compensate for self-interference noise to allow for and/or improve full duplex transmission. For example, it may be desirable for wireless transmitters 111, 113 of the electronic device 110 to transmit wireless transmission signals at a certain frequency band; and, at the same time or simultaneously, wireless receivers 105, 107 receive wireless transmission signals on a different frequency band. The self-interference noise calculator 240 may determine the self-interference contributed from each wireless transmission based on the transmitter output data to compensate for each received wireless transmission with an adjusted signal $y_1(n)$ 241 and/or $y_2(n)$ 243.

Particularly as wireless communications move toward or employ 5G standards, efficient use of wireless spectra may become increasingly important. Accordingly, the adjusted signals $y_1(n)$ 241 and $y_2(n)$ 243 may compensate for interference generated by one or more of the power amplifiers 219, 229 at harmonic frequencies of certain frequencies and/or at additional frequency components based on the frequency being amplified at respective power amplifiers 219, 229. For example, with the amplified data signals $x_1(n)$, $x_2(n)$ 221, 223, the self-interference noise calculator may compensate for intermodulation components generated by the power amplifiers 219, 229.

An intermodulation component may be generated internally in the electronic device 110 by the difference of the two frequencies being amplified or by the nonlinear characteristics of the power amplifiers 219, 229. In an example, interference may be created in the 1.8 GHz band from difference of two frequencies. The wireless transmitter 111 modulates the data signal 211 to the 1.8 GHz band (e.g., the first frequency). The wireless transmitter 113 modulates the data signal 213 to the 3.5 GHz band (e.g., the second frequency), Interference may be created, by the power amplifiers 219, 229, at a frequency that is the difference of these two frequencies (e.g., 1.7 GHz), which may cause some interference at the 1.8 GHZ band. Accordingly, if the first and second transmitter 111, 113 generate a difference frequency that is close to the intended transmission frequency of the first or second frequency, the compensation components 245, 247 may be utilized to compensate that interference utilizing the adjusted signals $y_1(n)$ 241 and $y_2(n)$ 243.

Examples of self-interference noise calculators described herein may provide the adjusted signals adjusted signals $y_1(n)$, $y_2(n)$ 241, 243 to receiver(s) and/or transceiver(s). Compensation components 245, 247 may receive the adjusted signals $y_1(n)$, $y_2(n)$ 241, 243 and compensate for an incoming received wireless transmission from antennas 105, 107. For example, the compensation components 245, 247 may combine the adjusted signals with the incoming received wireless transmission in a manner which compensates for (e.g. reduces) self-interference. In some examples, the compensation components 245, 247 may subtract the adjusted signals $y_1(n)$, $y_2(n)$ 241, 243 from the received wireless transmission to produce the compensated received signals for the respective wireless receivers 115, 117. For example, the compensation components 245, 247 may be implemented as adders and/or subtractors. The compensation components 245, 247 may communicate the compensated received signals to the wireless receivers 115, 117.

The wireless receivers 115, 117 may process the compensated received signal with the operations of a radio-frequency (RF) front-end. The wireless receiver may process the compensated received signals as a wireless receiver 400, described below with reference to FIG. 4, for example. While the compensation components 245, 247 have been described in terms of subtracting an adjusting signal from a received wireless transmission, it can be appreciated that various compensations may be possible, such as adjusted signal that operates as a transfer function compensating the received wireless transmission or an adjusted signal that operates as an optimization vector to multiply the received wireless transmission. Responsive to such compensation, electronic device 110 may transmit and receive wireless communications signals in a full duplex transmission mode.

Figure 5A:
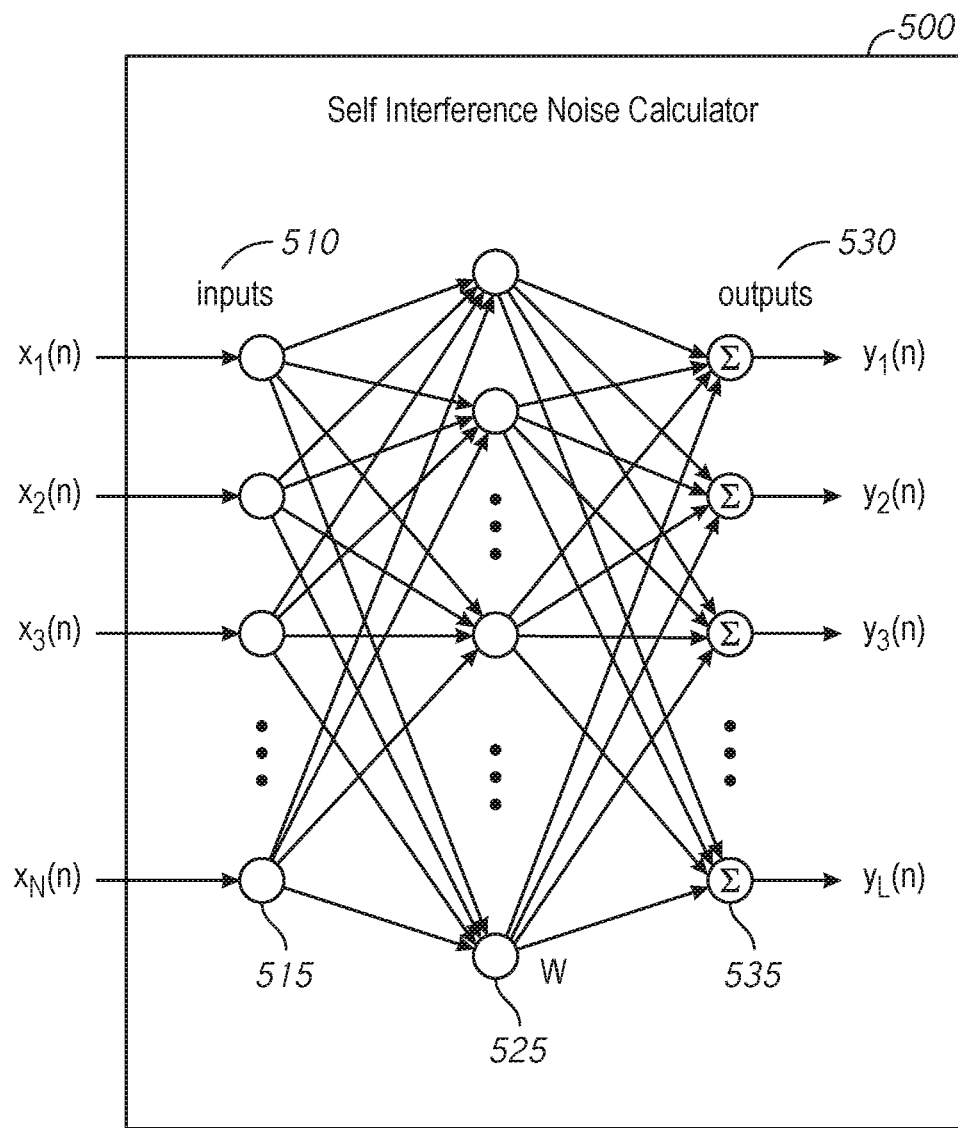
FIG. 5A is a schematic illustration of an example self-interference noise calculator arranged in accordance with examples described herein.

Examples of self-interference noise calculators described herein, including the self-interference noise calculator 240 of FIG. 2A may be implemented using hardware, software, firmware, or combinations thereof. For example, self-interference noise calculator 240 may be implemented using circuitry and/or one or more processing unit(s) processors) and memory encoded with executable instructions for causing the self-interference noise calculator to perform one or more functions described herein. FIG. 5A depicts an exemplary self-interference noise calculator.

Figure 2B:
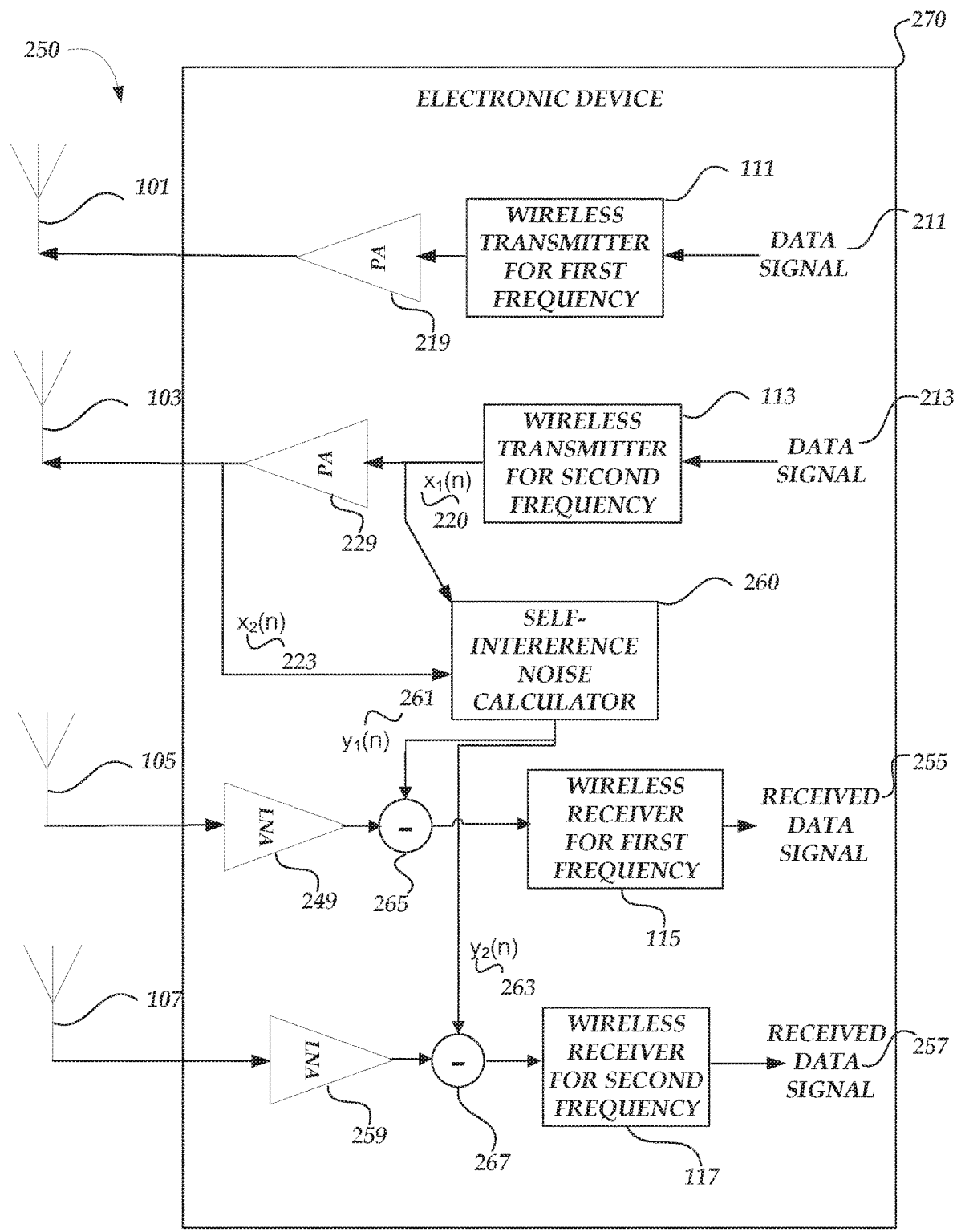
FIG. 2B is a schematic illustration of an electronic device arranged in accordance with examples described herein.

FIG. 2B is a schematic illustration 250 of an electronic device 270 arranged in accordance with examples described herein. Similarly, numbered elements of FIG. 2B include analogous functionality to those numbered elements of FIG. 2A. The electronic device 270 may also include self-interference noise calculator 260, compensation component 265, and compensation component 267. Each wireless transmitter 111, 113 may be in communication with a respective antenna, such as antenna 101, antenna 103 via respective power amplifiers, such as power amplifiers 219, 229. Each wireless transmitter 111, 113 receives a respective data signal, such as data signals 211, 213. The wireless transmitter 113 may process the data signal 213 with the operations of a radio-frequency (RF) front-end to generate signal $x_1(n)$ 220. The signal $x_1(n)$ 220 may be amplified by the power amplifier 229 to generate amplified signal $x_2(n)$ 223.

The data signals $x_1(n)$, $x_2(n)$ 220, 223 are provided in the electronic device 110 to the self-interference noise calculator 260. For example, the data signals $x_1(n)$, $x_2(n)$ 220, 223 may be provided to the self-interference noise calculator 260 via internal paths from an output of the wireless transmitter 113 and an output of the power amplifier 229. Accordingly, paths stemming from the wireless transmitter 113 and the self-interference noise calculator 260 may be in communication with one another. The self-interference noise calculator 260, therefore, receives a first data signal $x_1(n)$ 220 associated with the second frequency from the wireless transmitter 113 for the second frequency and a second amplified data signal $x_2(n)$ 223 associated with the second frequency the power amplifier 229.

Self-interference noise calculator 260 and compensation components 265, 267 may be in communication with one another. Each wireless receiver may be in communication with a respective antenna via a receiver path of the respective wireless receivers 115, 117, such as antenna 105, 107 via a respective compensation component, such as compensation component 265, 267, and respective low-noise amplifiers (LNA) 249, 259. In some examples, a wireless transmission received at antennas 105, 107 may be communicated to wireless receiver 115, 117 after amplification of the received signal by LNAs 249, 259 and compensation of self-interference by the respective compensation component 265, 267. Each wireless receiver 115, 117 processes the received, amplified, and compensated wireless transmission to produce a respective received data signal, such as received data signals 255, 257. In other examples, fewer, additional, and/or different components may be provided.

Examples of self-interference noise calculators described herein may generate and provide adjusted signals to compensation components. So, for example, the self-interference noise calculator 260 may generate adjusted signals $y_1(n)$, $y_2(n)$ 261, 263 and provide such adjusted signals to the compensation components 265, 267. The self-interference noise calculator 260 may generate such adjusted signals $y_1(n)$, $y_2(n)$ 261, 263 based on the data signals $x_1(n)$, $x_2(n)$ 220, 223. The self-interference noise calculator 260 may be in communication with multiple (e.g. all) wireless transmitters paths of the electronic device 110 and all the respective compensation components coupled to respective wireless receivers, and may provide adjusted signals based on transmitter output data signals and/or amplifier output data signals, such as data signals $x_1(n)$, $x_2(n)$ 220, 223.

It may be desirable in some examples to compensate for the self-interference noise to achieve full duplex transmission. For example, it may be desirable for wireless transmitters 111,113 of the electronic device 110 to transmit wireless transmission signals at a certain frequency band; and, at the same time or simultaneously, wireless receivers 105, 107 receive wireless transmission signals on a different frequency band. The self-interference noise calculator 260 may determine the self-interference contributed from each wireless transmission based on the transmitter output data to compensate for each received wireless transmission with an adjusted signal $y_1(n)$, $y_2(n)$ 261, 263. Accordingly, the adjusted signals $y_1(n)$, $y_2(n)$ 261, 263 may compensate for interference generated by the power amplifier 229 at harmonic frequencies of certain frequencies or additional frequency components derived from the frequency being amplified at the power amplifier 229. For example, with the data signals $x_1(n)$, $x_2(n)$ 220, 223, the self-interference noise calculator may compensate for harmonic frequencies generated by the power amplifier 229.

A harmonic frequency may be generated internally in the electronic device 110 or by the nonlinear characteristics of the power amplifier 229 based on the frequency being amplified. In an example, interference may be created in the 3.5 GHz band from a second-order harmonic frequency of the frequency being amplified by the power amplifier 229. In an example, the first frequency of the wireless transmitter 111 may modulate the data signal 211 to the 3.5 GHz band and the second frequency of the wireless transmitter 113 may modulate the data signal 213 to the 1.8 GHz band. Accordingly, the power amplifier 229 may amplify the modulated data signal $x_1(n)$ 220 having a frequency in the 1.8 GHz band, and may introduce harmonic components into the amplified data signal $x_2(n)$ 223, such as a second-order harmonic component at 3.6 GHz, which may interfere with the 3.5 GHz band. Accordingly, if the first and second transmitter 111, 113 generate a harmonic component that is close to the intended transmission frequency of the first or second frequency, the compensation components 265, 267 may be utilized to compensate that interference utilizing the adjusted signals $y_1(n)$, $y_2(n)$ 265, 267.

While FIGS. 2A and 2B depict respective self-interference calculators 240, 260 operating on data signals from the same or different paths of wireless transmitters 111, 113 at varying frequencies, it can be appreciated that various paths with data signals, whether amplified, modulated, or initial, may be provided to a self-interference noise calculator, such as self-interference calculators 240, 260, to compensate for noise from interference generated by respective received transmission signals, such as transmission signals received at antennas 105, 107. For example, in an embodiment, a self-interference calculator may receive each of the data signals being received in FIGS. 2A and 2B (e.g., data signals 221, 223, and 220) and may provide adjusted signals to varying points in a receiver path, for example, as adjusted signals 241, 243, 261, and 263 are provided to paths of wireless receiver 115 and/or wireless receiver 117. Accordingly, the electronic devices 110, 270 of FIGS. 2A and 2B may be utilized in system 100 as electronic devices 102 and/or 110 to compensate for self-interference noise generated in transmitting data signals from the electronic devices communicating in such a system.

Figure 3:
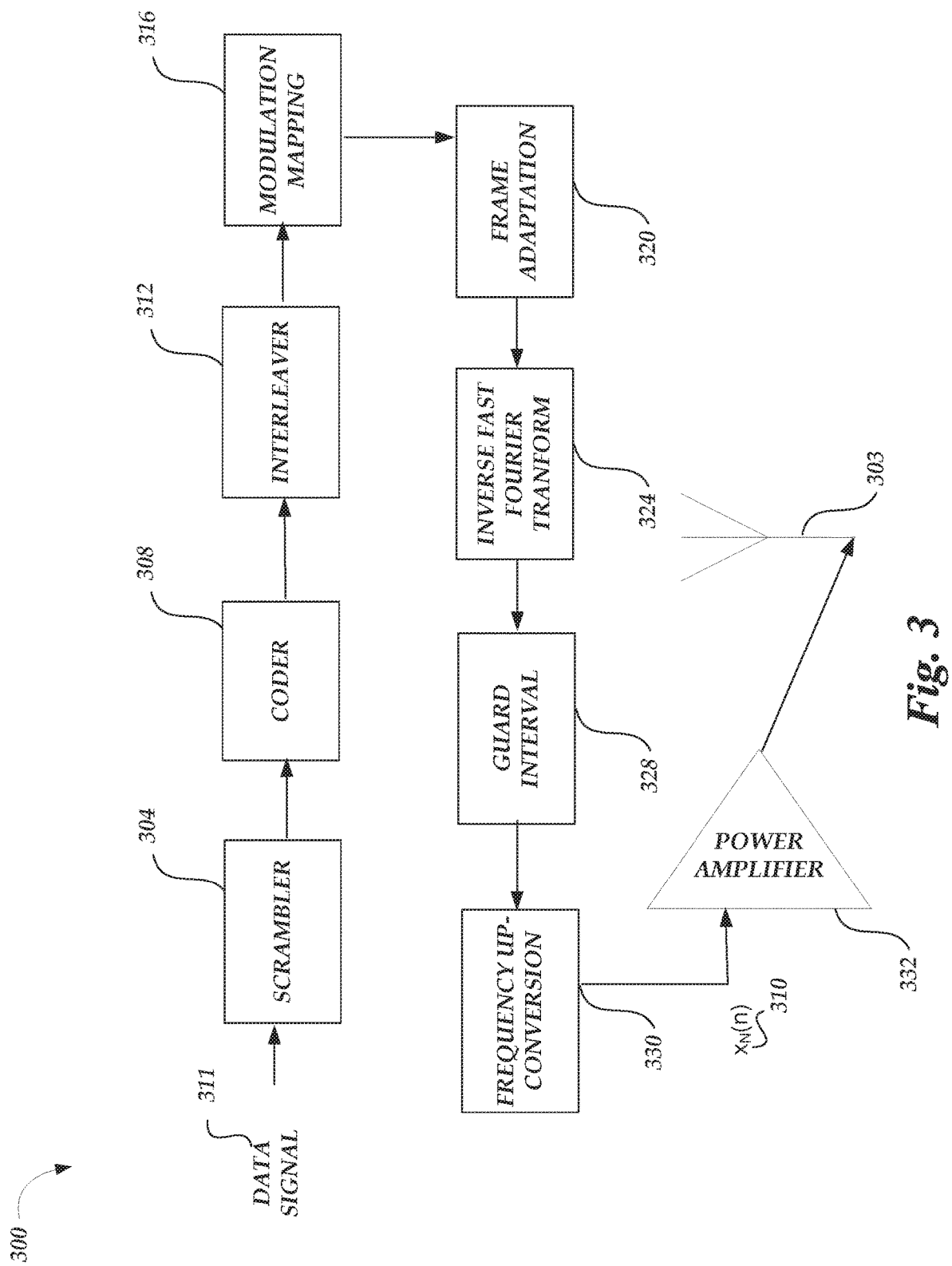
FIG. 3 is a schematic illustration of a wireless transmitter.

FIG. 3 is a schematic illustration of a wireless transmitter 300. The wireless transmitter 300 receives a data signal 311 and performs operations to generate wireless communication signals for transmission via the antenna 303. The wireless transmitter 300 may be utilized to implement the wireless transmitters 111, 113 in FIGS. 1, 2A, 2B, or wireless transmitters 131, 133 of FIG. 1, for example. The transmitter output data $x_N(n)$ 310 is amplified by a power amplifier 332 before the output data are transmitted on an RF antenna 303. The operations to the RF-front end may generally be performed with analog circuitry or processed with a digital baseband operation for implementation of a digital front-end. The operations of the RF-front end include a scrambler 304, a coder 308, an interleaver 312, a modulation mapping 316, a frame adaptation 320, an IFFT 324, a guard interval 328, and frequency up-conversion 330.

The scrambler 304 may convert the input data to a pseudo-random or random binary sequence. For example, the input data may be a transport layer source (such as MPEG-2 Transport stream and other data) that is converted to a Pseudo Random Binary Sequence (PRBS) with a generator polynomial. While described in the example of a generator polynomial, various scramblers 304 are possible.

The coder 308 may encode the data outputted from the scrambler to code the data. For example, a Reed-Solomon (RS) encoder, turbo encoder may be used as a first coder to generate a parity block for each randomized transport packet fed by the scrambler 304. In some examples, the length of parity block and the transport packet can vary according to various wireless protocols. The interleaver 312 may interleave the parity blocks output by the coder 308, for example, the interleaver 312 may utilize convolutional byte interleaving. In some examples, additional coding and interleaving can be performed after the coder 308 and interleaver 312. For example, additional coding may include a second coder that may further code data output from the interleaver, for example, with a punctured convolutional coding having a certain constraint length. Additional interleaving may include an inner interleaver that forms groups of joined blocks. While described in the context of a RS coding, turbo coding, and punctured convolution coding, various coders 308 are possible, such as a low-density parity-check (LDDC) coder or a polar coder. While described in the context of convolutional byte interleaving, various interleavers 312 are possible.

The modulation mapping 316 may modulate the data output from the interleaver 312. For example, quadrature amplitude modulation (QAM) may be used to map the data by changing (e.g., modulating) the amplitude of the related carriers. Various modulation mappings may be used, including, but not limited to: Quadrature Phase Shift Keying (QPSK), SCMA NOMA, and MU SA (Multi-user Shared Access). Output from the modulation mapping 316 may be referred to as data symbols. While described in the context of QAM modulation, various modulation mappings 316 are possible. The frame adaptation 320 may arrange the output from the modulation mapping according to bit sequences that represent corresponding modulation symbols, carriers, and frames.

The IFFT 324 may transform symbols that have been framed into sub-carriers (e.g., by frame adaptation 320) into time-domain symbols. Taking an example of a 5G wireless protocol scheme, the IFFT can be applied as N-point IFFT:

$$x_k = \sum_{n=1}^{N} X_n e^{j2\pi kn/N} \tag{1}$$

where $X_n$ is the modulated symbol sent in the nth 5G sub-carrier. Accordingly, the output of the IFFT 324 may form time-domain 5G symbols. In some examples, the IFFT 324 may be replaced by a pulse shaping filter or poly-phase filtering banks to output symbols for frequency up-conversion 330.

In the example of FIG. 3, the guard interval 328 adds a guard interval to the time-domain 5G symbols. For example, the guard interval may be a fractional length of a symbol duration that is added, to reduce inter-symbol interference, by repeating a portion of the end of a time-domain 5G symbol at the beginning of the frame. For example, the guard interval can be a time period corresponding to the cyclic prefix portion of the 5G wireless protocol scheme.

The frequency up-conversion 330 may up-convert the time-domain 5G symbols to a specific radio frequency. For example, the time-domain 5G symbols can be viewed as a baseband frequency range and a local oscillator can mix the frequency at which it oscillates with the 5G symbols to generate 5G symbols at the oscillation frequency. A digital up-converter (DUC) may also be utilized to convert the time-domain 5G symbols. Accordingly, the 5G symbols can be up-converted to a specific radio frequency for an RF transmission.

Before transmission, at the antenna 303, a power amplifier 332 may amplify the transmitter output data $x_N(n)$ 310 to output data for an RE transmission in an RF domain at the antenna 303. The antenna 303 may be an antenna designed to radiate at a specific radio frequency. For example, the antenna 303 may radiate at the frequency at which the 5G symbols were up-converted. Accordingly, the wireless transmitter 300 may transmit an RF transmission via the antenna 303 based on the data signal 311 received at the scrambler 304. As described above with respect to FIG. 3, the operations of the wireless transmitter 300 can include a variety of processing operations. Such operations can be implemented in a conventional wireless transmitter, with each operation implemented by specifically-designed hardware for that respective operation. For example, a DSP processing unit may be specifically-designed to implement the IFFT 324. As can be appreciated, additional operations of wireless transmitter 300 may be included in a conventional wireless receiver.

Figure 4:
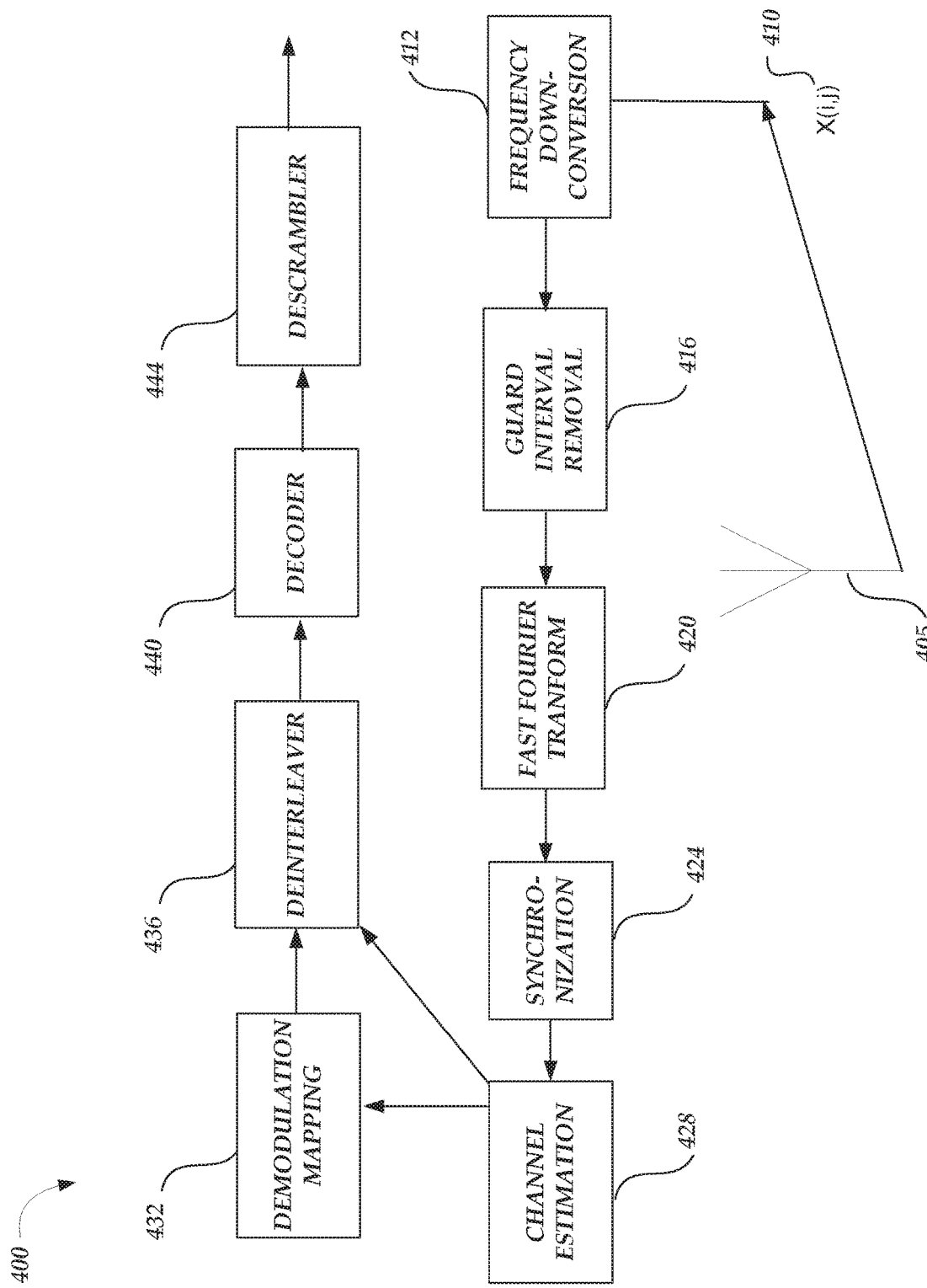
FIG. 4 is a schematic illustration of wireless receiver.

FIG. 4 is a schematic illustration of wireless receiver 400. The wireless receiver 400 receives input data X (i,j) 410 from an antenna 405 and performs operations of a wireless receiver to generate wireless receiver output data at the descrambler 444. The wireless receiver 400 may be utilized to implement the wireless receivers 115, 117 in FIGS. 1, 2A, 2B, for example or wireless receivers 135, 137 of FIG. 1. The antenna 405 may be an antenna designed to receive at a specific radio frequency. The operations of the wireless receiver may be performed with analog circuitry or processed as a digital baseband operation for implementation of a digital front-end. The operations of the wireless receiver include a frequency down-conversion 412, guard interval removal 416, a fast Fourier transform 420, synchronization 424, channel estimation 428, a demodulation mapping 432, a deinterleaver 436, a decoder 440, and a descrambler 444.

The frequency down-conversion 412 may down-convert the frequency domain symbols to a baseband processing range. For example, continuing in the example of a 5G implementation, the frequency-domain 5G symbols may be mixed with a local oscillator frequency to generate 5G symbols at a baseband frequency range. A digital down-converter (DDC) may also be utilized to convert the frequency domain symbols. Accordingly, the RF transmission including time-domain 5G symbols may be down-converted to baseband. The guard interval removal 416 may remove a guard interval from the frequency-domain 5G symbols. The FFT 420 may transform the time-domain 5G symbols into frequency-domain 5G symbols. Taking an example of a 5G wireless protocol scheme, the FFT can be applied as N-point FFT:

$$X_n = \sum_{k=1}^{N} x_k e^{-i2\pi kn/N} \quad (2)$$

where $X_n$ is the modulated symbol sent in the nth 5G sub-carrier. Accordingly, the output of the FFT 420 may form frequency-domain 5G symbols. In some examples, the FFT 420 may be replaced by poly-phase filtering banks to output symbols for synchronization 424.

The synchronization 424 may detect pilot symbols in the 5G symbols to synchronize the transmitted data. In some examples of a 5G implementation, pilot symbols may be detected at the beginning of a frame (e.g., in a header) in the time-domain. Such symbols can be used by the wireless receiver 400 for frame synchronization. With the frames synchronized, the 5G symbols proceed to channel estimation 428. The channel estimation 428 may also use the time-domain pilot symbols and additional frequency-domain pilot symbols to estimate the time or frequency effects (e.g., path loss) to the received signal.

For example, a channel may be estimated according to N signals received through N antennas (in addition to the antenna 405) in a preamble period of each signal. In some examples, the channel estimation 428 may also use the guard interval that was removed at the guard interval removal 416. With the channel estimate processing, the channel estimation 428 may compensate for the frequency-domain 5G symbols by some factor to minimize the effects of the estimated channel. While channel estimation has been described in terms of time-domain pilot symbols and frequency-domain pilot symbols, other channel estimation techniques or systems are possible, such as a MIMO-based channel estimation system or a frequency-domain equalization system.

The demodulation mapping 432 may demodulate the data outputted from the channel estimation 428. For example, a quadrature amplitude modulation (QAM) demodulator can map the data by changing modulating) the amplitude of the related carriers. Any modulation mapping described herein can have a corresponding demodulation mapping as performed by demodulation mapping 432. In some examples, the demodulation mapping 432 may detect the phase of the carrier signal to facilitate the demodulation of the 5G symbols. The demodulation mapping 432 may generate bit data from the 5G symbols to be further processed by the deinterleaver 436.

The deinterleaver 436 may deinterleave the data bits, arranged as parity block from demodulation mapping into a bit stream for the decoder 440, for example, the deinterleaver 436 may perform an inverse operation to convolutional byte interleaving. The deinterleaver 436 may also use the channel estimation to compensate for channel effects to the parity blocks.

The decoder 440 may decode the data outputted from the scrambler to code the data. For example, a Reed-Solomon (RS) decoder or turbo decoder may be used as a decoder to generate a decoded bit stream for the descrambler 444. For example, a turbo decoder may implement a parallel concatenated decoding scheme, in some examples, additional decoding and/or deinterleaving may be performed after the decoder 440 and deinterleaver 436. For example, additional decoding may include another decoder that may further decode data output from the decoder 440. While described in the context of a RS decoding and turbo decoding, various decoders 440 are possible, such as low-density parity-check (LDDC) decoder or a polar decoder.

The descrambler 444 may convert the output data from decoder 440 from a pseudo-random or random binary sequence to original source data. For example, the descrambler 44 may convert decoded data to a transport layer destination (e.g., MPEG-2 transport stream) that is descrambled with an inverse to the generator polynomial of the scrambler 304. The descrambler thus outputs receiver output data. Accordingly, the wireless receiver 400 receives an RF transmission including input data X (i,j) 410 via to generate the receiver output data.

As described herein, for example with respect to FIG. 4, the operations of the wireless receiver 400 can include a variety of processing operations. Such operations can be implemented in a conventional wireless receiver, with each operation implemented by specifically-designed hardware for that respective operation. For example, a DSP processing unit may be specifically-designed to implement the FFT 420. As can be appreciated, additional operations of wireless receiver 400 may be included in a conventional wireless receiver.

FIG. 5A is a schematic illustration of an example self-interference noise calculator 500 arranged in accordance with examples described herein. The self-interference noise calculator 500 may be utilized to implement the self-interference noise calculators 240, 260 of FIG. 2A or 2B or the self-interference noise calculator 640, 690 of FIG. 6A or 6B for example. The self-interference noise calculator 500 includes a network of processing elements 515, 525, 535 that output adjusted signals $y_1(n)$, $y_2(n)$, $y_3(n)$, $y_L(n)$ 530 based on transmitter output data $x_1(n)$, $x_2(n)$, $x_3(n)$, $x_N(n)$ 510. For example, the transmitter output data $x_1(n)$, $x_2(n)$, $x_3(n)$, $x_N(n)$ 510 may correspond to inputs for respective antennas of each transmitter generating the respective $X_1(n)$, $x_2(n)$, $x_3(n)$, $x_N(n)$ 510. The processing elements 515 receive the transmitter output data $x_1(n)$, $x_2(n)$, $x_3(n)$, $x_N(n)$ 510 as inputs.

The processing elements 515 may be implemented, for example, using bit manipulation units that may forward the transmitter output data $x_1(n)$, $x_2(n)$, $x_3(n)$, $x_N(n)$ 510 to processing elements 525. Processing elements 525 may be implemented, for example, using multiplication units that include a non-linear vector set (e.g., center vectors) based on a non-linear function, such as a Gaussian function (e.g.:

$$f(r) = \exp\left(-\frac{r^2}{\sigma^2}\right),$$

a multi-quadratic function (e.g., $f(r)=(r^2+\sigma^2)$), an inverse multi-quadratic function (e.g., $f(r)=(r^2+\sigma^2)$), a thin-plate spine function (e.g., $f(r)=r^2 \log(r)$), a piece-wise linear function $$\left(\text{e.g., } f(r) = \frac{1}{2}(|r+1| - |r-1|)\right),$$

or a cubic approximation function $$\left(\text{e.g., } f(r) = \frac{1}{2}(|r^3+1| - |r^3-1|)\right),$$

In some examples, the parameter a is a real parameter (e.g., a scaling parameter) and r is the distance between the input signal (e.g., $x_1(n), x_2(n), x_3(n), x_N(n)$ 510) and a vector of the non-linear vector set. Processing elements 535 may be implemented, for example, using accumulation units that sum the intermediate processing results received from each of the processing elements 525, in communicating the intermediate processing results, each intermediate processing result may be weighted with a weight 'W'. For example, the multiplication processing units may weight the intermediate processing results based on a minimized error for the all or some of the adjustment signals that may generated by a self-interference noise calculator.

The processing elements 525 may include a non-linear vector set and may be denoted as $C_i$ (for i=1, 2, . . . H may represent the number of processing elements 525. With the transmitter output data $x_1(n), x_2(n), x_3(n), x_N(n)$ 510 received as inputs to processing elements 525, after forwarding by processing elements 515, the output of the processing elements 525, operating as multiplication processing units, may be expressed as $h_i(n)$, such that:

$$h_i(n) = f_i(\|XX(n) - C_i\|)(i=1,2, \ldots, H) \quad (3)$$

$f_i$ may represent a non-linear function that is applied to the magnitude of the difference between $x_1(n), x_2(n), x_3(n), x_N(n)$ 510 and the center vectors $C_i$. The output $h_i(n)$ may represent a non-linear function such as a Gaussian function, multi-quadratic function, an inverse multi-quadratic function, a thin-plate spine function, or a cubic approximation function. For example, such a non-linear function may represent or model the non-linear characteristics of a power amplifier, such as power amplifiers 219, 229.

The output $h_i(n)$ of the processing elements 525 may be weighted with a weight matrix 'W'. The output $h_i(n)$ of the processing elements 525 can be referred to as intermediate processing results of the self-interference noise calculator 500. For example, the connection between the processing elements 525 and processing elements 535 may be a linear function such that the summation of a weighted output $h_i(n)$ such that the adjusted signals $y_1(n), y_2(n), y_3(n), y_L(n)$ 530 may be expressed, in Equation (4) as:

$$y_i(n) = \sum_{j=1}^{H} W_{ij} h_j(n) = \sum_{j=1}^{H} W_{ij} f_j(\|X(n) - C_j\|)(i=1,2, \ldots, L) \quad (4)$$

Accordingly, the adjusted signals $y_1(n), y_2(n), y_3(n), y_L(n)$ 530 may be the output $y_i(n)$ of the i'th processing element 535 at time n, where L is the number of processing elements 535. $W_{ij}$ is the connection weight between j'th processing element 525 and i'th processing element 535 in the output layer.

Figure 6A:
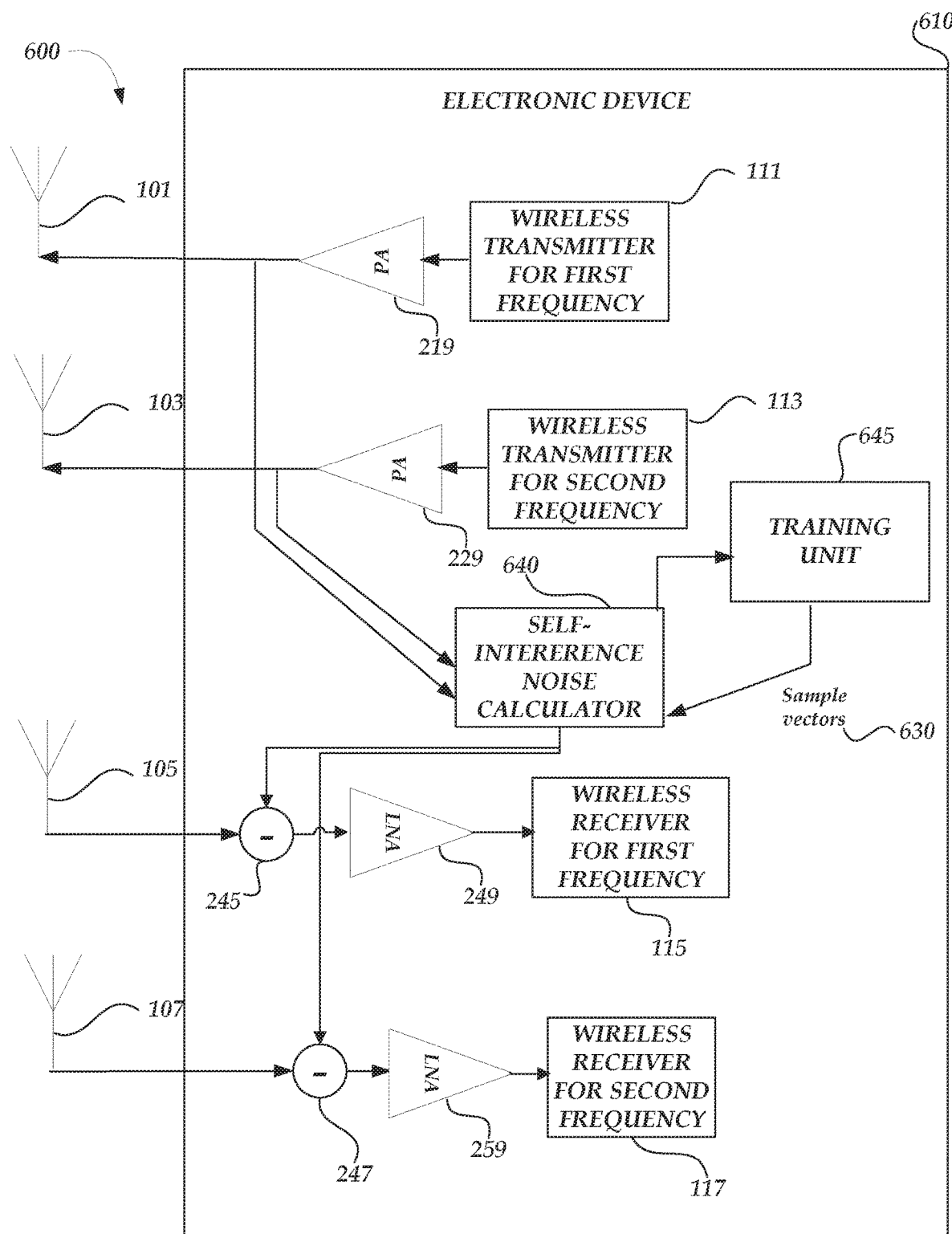
FIG. 6A is a schematic illustration of an electronic device arranged in accordance with examples described herein.
Figure 6B:
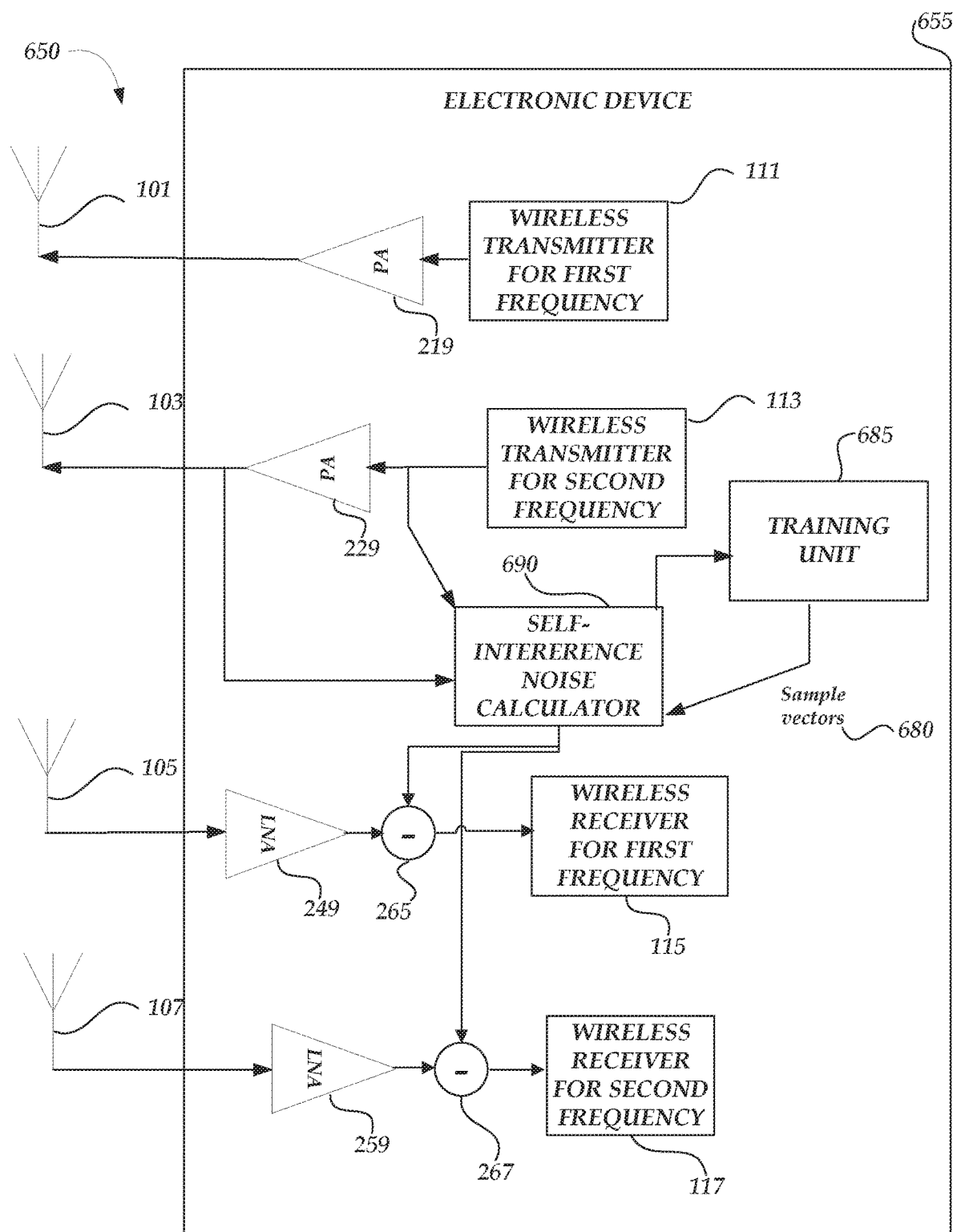
FIG. 6B is a schematic illustration of an electronic device arranged in accordance with examples described herein.

As described with respect to FIG. 6, the center vectors $C_i$ and the connection weights $W_{ij}$ of each layer of processing elements may be determined by a training unit (e.g., training unit 645 of FIG. 6A or training unit 685 of FIG. 6B) that utilizes sample vectors (e.g., sample vectors 630 or sample vectors 680) to train a self-interference calculator 640. Advantageously, the adjusted signals $y_1(n), y_2(n), y_3(n), y_L(n)$ 530 generated from the transmitter output data $x_1(n), x_2(n), x_3(n), x_N(n)$ 510 may be computed with near-zero latency such that self-interference compensation may be achieved in any electronic device including a self-interference noise calculator, such as the self-interference noise calculator 500. A wireless device or system that implements a self-interference noise calculator 500 may achieve full duplex transmission. For example, the adjusted signals generated by the interference noise calculator 500 may compensate-interference that an antenna of the wireless device or system will experience due to signals to be transmitted by another antenna of the wireless device or system, for example signals being transmitted at a same frequency or a different frequency.

While the self-interference noise calculator 500 has been described with respect to a single layer of processing elements 525 that include multiplication units, it can be appreciated that additional layers of processing elements with multiplication units may be added between the processing elements 515 and the processing elements 535. The self-interference noise calculator may be scalable in hardware form, with additional multiplication units being added to accommodate additional layers. Using the methods and systems described herein, additional layer(s) of processing elements including multiplication processing units and the processing elements 525 may be optimized to determine the center vectors $C_i$ and the connection weights $W_{ij}$ of each layer of processing elements including multiplication units.

The self-interference noise calculator 500 can be implemented using one or more processing units, for example, having any number of cores. An example processing unit can include an arithmetic logic unit (ALU), a bit manipulation unit, a multiplication unit, an accumulation unit, an adder unit, a look-up table unit, a memory look-up unit, or any combination thereof. For example, a processing unit 550 is described with reference to FIG. 5B including multiplication units, accumulation units, and, memory look-up units.

In an example processor core, a set of instructions can be loaded that implements calculations performed by the self-interference noise calculator 500. In some examples, the self-interference noise calculator 240 may include circuitry, including custom circuitry, and/or firmware for performing functions described herein. For example, circuitry can include multiplication unit, accumulation units, and/or bit manipulation units for performing the described functions, as described herein. The self-interference noise calculator 500 may be implemented in any type of processor architecture including but not limited to a microprocessor or a digital signal processor (DSP), or any combination thereof. A portion of the processor implementing the self-interference noise calculator 500 may implement the training unit 645. Accordingly, the training unit 645 may also be implemented in any type of processor architecture including but not limited to a microprocessor or a digital signal processor (DSP), or any combination thereof. In an example processor core, a set of instructions can be loaded that implements the training of the self-interference noise calculator 500 by a training unit being provided sample vectors, such as training unit 645 being provided sample vectors 630.

Figure 5B:
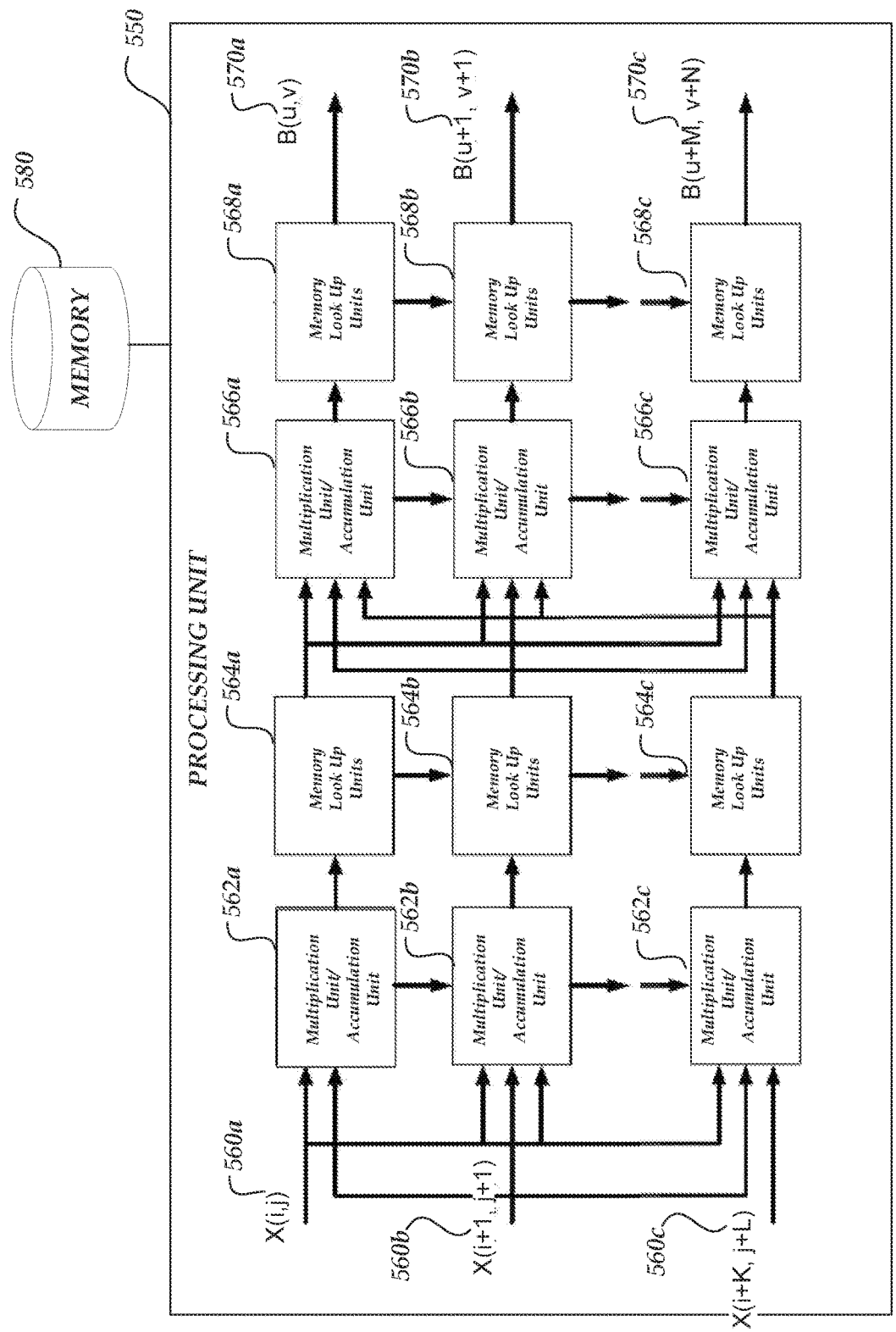
FIG. 5B is a schematic illustration of an example processing unit arranged in accordance with examples described herein.

FIG. 5B is a block diagram of a processing unit 550, which may be implemented as a self-interference noise calculator 500, in accordance with examples described herein. The processing unit 550 may receive input data (e.g. X (i,j)) 560a-c from such a computing system. In some examples, the input data 560a-c may be input data, such as data received from a sensor or data stored in the memory 580. For example, data stored in the memory 580 may be output data generated by the processing unit 550 (e.g., self-interference noise calculator) at another time period. For example, the output data may be processed adjusted signals (e.g., adjusted signals $y_1(n)$, $y_2(n)$, $y_3(n)$, $y_L(n)$ 530). The processing unit 550 may include multiplication unit/accumulation units 562a-c, 566a-c and memory lookup units 564a-c, 568a-c that, when mixed with adjusted signals retrieved from the memory 580, may generate output data (e.g. B (u,v)) 570a-c. In some examples, the output data 570a-c may be utilized as input data to be utilized as adjusted signals.

The processing unit 550, may be provide instructions cause the processing unit 550 to configure the multiplication units 562a-c to multiply input data 560a-c with coefficient data and accumulation units 566a-c to accumulate processing results to generate the output data 570a-c.

The multiplication unit/accumulation units 562a-c, 566a-c multiply two operands from the input data 560a-c to generate a multiplication processing result that is accumulated by the accumulation unit portion of the multiplication unit/accumulation units 562a-c, 566a-c. The multiplication unit/accumulation units 562a-c, 566a-c adds the multiplication processing result to update the processing result stored in the accumulation unit portion, thereby accumulating the multiplication processing result. For example, the multiplication unit/accumulation units 562a-c, 566a-c may perform a multiply-accumulate operation such that two operands, M and N, are multiplied and then added with P to generate a new version of that is stored in its respective multiplication unit/accumulation units. The memory look-up units 564a-c, 568a-c retrieve coefficient data (e.g., adjusted signals from another time period) stored in memory 580. For example, the memory look-up unit can be a table look-up that retrieves a specific coefficient (e.g., a specific adjusted signal). The output of the memory look-up units 564a-c, 568a-c is provided to the multiplication unit/accumulation units 562a-c, 566a-c that may be utilized as a multiplication operand in the multiplication unit portion of the multiplication unit/accumulation units 562a-c, 566a-c. Using such a circuitry arrangement, the output data (e.g. B (u,v)) 570a-c may be generated from the input data (e.g. X (i,j)) 560a-c.

In some examples, coefficient data, for example from memory 580, can be mixed with the input data X (i,j) 560a-c to generate the output data B (u,v) 570a-c. The relationship of the coefficient data to the output data B (u,v) 570a-c based on the input data X (i,j) 560a-c may be expressed as:

where $a_{k,l}'$, $a_{m,n}''$ are coefficients for the first set of multiplication/accumulation units 562a-c and second set of multiplication/accumulation units 566a-c, respectively, and where $f(\cdot)$ stands for the mapping relationship performed by the memory look-up units 564a-c, 568a-c. As described above, the memory look-up units 564a-c, 568a-c retrieve coefficients to mix with the input data. Accordingly, the output data may be provided by manipulating the input data with multiplication/accumulation units using a set of coefficients stored in the memory associated with a desired wireless protocol. The resulting mapped data may be manipulated by additional multiplication/accumulation units using additional sets of coefficients stored in the memory associated with the desired wireless protocol. The sets of coefficients multiplied at each stage of the processing unit 550 may represent or provide an estimation of the processing of the input data in specifically-designed hardware (e.g., an FPGA).

Further, it can be shown that the system 500, as represented by Equation (5), may approximate any nonlinear mapping with arbitrarily small error in some examples and the mapping of system 500 is determined by the coefficients $a_{k,l}'$, $a_{m,n}''$. For example, if such coefficient data is specified, any mapping and processing between the input data X (i,j) 560a-c and the output data B (u,v) 570a-c may be accomplished by the system 500. Such a relationship, as derived from the circuitry arrangement depicted in system 500, may be used to train an entity of the computing system 500 to generate coefficient data. For example, using Equation (5), an entity of the computing system 500 may compare input data to the output data to generate the coefficient data.

In the example of system 500, the processing unit 550 mixes the coefficient data with the input data X (i,j) 560a-c utilizing the memory look-up units 564a-c, 568a-c. In some examples, the memory look-up units 564a-c, 568a-c can be referred to as table look-up units. The coefficient data may be associated with a mapping relationship for the input data X (i,j) 560a-c to the output data B (u,v) 570a-c. For example, the coefficient data may represent non-linear mappings of the input data X (i,j) 560a-c to the output data B (u,v) 570a-c. In some examples, the non-linear mappings of the coefficient data may represent a Gaussian function, a piece-wise linear function, a sigmoid function, a thin-plate-spline function, a multi-quadratic function, a cubic approximation, an inverse multi-quadratic function, or combinations thereof. In some examples, some or all of the memory look-up units 564a-c, 568a-c may be deactivated. For example, one or more of the memory look-up units 564a-c, 568a-c may operate as a gain unit with the unity gain.

Each of the multiplication unit/accumulation units 562a-c, 566a-c may include multiple multipliers, multiple accumulation unit, or and/or multiple adders. Any one of the multiplication unit/accumulation units 562a-c, 566a may be implemented using an ALU. In some examples, any one of the multiplication unit/accumulation units 562a-c, 566a-c can include one multiplier and one adder that each perform, respectively, multiple multiplications and multiple additions. The input-output relationship of a multiplication/accumulation unit 562, 566 may be represented as:

$$B(u, v) = f\left( \sum_{m,n}^{M,N} a_{m,n}'' f\left( \sum_{k,l}^{K,L} a_{k,l}' X(i+k, j+l) \right) \right) \quad (5)$$

$$B_{out} = \sum_{i=1}^{I} C_i * B_m(i) \quad (6)$$

where "I" represents a number to perform the multiplications in that unit, $C_i$ the coefficients which may be accessed from a memory, such as memory 580, and $B_m(i)$ represents a factor from either the input data X (i,j) 560a-c or an output from multiplication unit/accumulation units 562a-c, 566a-c. In an example, the output of a set of multiplication unit/accumulation units, $B_{out}$, equals the sum of coefficient data, $C_i$ multiplied by the output of another set of multiplication unit/accumulation units, $B_{in}(i)$. $B_{in}(i)$ may also be the input data such that the output of a set of multiplication unit/accumulation units, $B_{out}$, equals the sum of coefficient data, $C_i$ multiplied by input data.

FIG. 6A is a schematic illustration 600 of an electronic device 610 arranged in accordance with examples described herein. The electronic device 610 includes antennas 101, 103, 105, 107; wireless transmitters 111, 113; power amplifiers 219, 229; wireless receivers 115, 117; compensation components 245, 247; and LNAs 249, 259, which may operate in a similar fashion as described with reference to FIG. 2A. The electronic device 610 also includes the self-interference noise calculator 640 and training unit 645 that may provide sample vectors 660 to the self-interference noise calculator 640. The self-interference noise calculator 500 may be utilized to implement the self-interference noise calculator 640, for example. The training unit 645 may determine center vectors $C_i$ and the connection weights for example, by optimizing the minimized error of adjusted signals (e.g., adjusted signals 530 $y_i(n)$ of FIG. 5A). For example, an optimization problem can be solved utilizing a gradient descent procedure that computes the error, such that the minimized error may be expressed as:

$$E = \Sigma_{m=1}^{M} \|Y(n) - \overline{Y(n)}\|^2 \qquad (7)$$

$\overline{Y(n)}$ may be a corresponding desired output vector. To solve this minimization problem, the training unit 645 may utilize sample vectors to determine the center vectors $C_i$ and the connection weights $W_{ij}$.

To determine the center vectors $C_i$, the training unit 645 may perform a cluster analysis (e.g., a k-means cluster algorithm) to determine at least one center vector among a corresponding set of vectors, such as sample vectors 630 based on training points or random vectors. In the sample vector approach, a training point may be selected towards the center for each of the sample vectors 630. The training point may be center of each cluster partition of a set of the sample vectors 630, such that optimizing the cluster center is expressed as minimized error away from the cluster center for a given training point in the cluster partition. Such a relationship may be expressed as:

$$E_{k\_means} = \Sigma_{j=1}^{H} \Sigma_{n=1}^{M} B_{jn} \|X(n) - C_j\|^2 \qquad (8)$$

where $B_{jn}$ is the cluster partition or membership function forming an H×M matrix. Each column of H×M matrix represents an available sample vector and each row of H×M matrix represents a cluster. Each column may include a single "1" in the row corresponding to the cluster nearest to that training point and zeroes in the other entries of that column. The training unit 645 may initialize the center of each cluster to a different randomly chosen training point. Then each training example may be assigned by the training unit 645 to a processing element (e.g., a processing element 525) nearest to it. When all training points have been assigned by the training unit 645, the training unit 645 may find the average position of the training point for each cluster and may move the cluster center to that point, when the error away from the cluster center for each training point is minimized, denoting the set of center vectors $C_i$ for the processing elements (e.g., the processing elements 525).

To determine the connection weights $W_{ij}$ for the connections between processing elements 525 and processing elements 535, the training unit 645 may utilize a linear least-squares optimization according to a minimization of the weights expressed as:

$$\min_W \sum_{n=1}^{M} \|Y(n) - \overline{Y(n)}\|^2 = \min_W \|WF - \hat{Y}\|^2 \qquad (9)$$

where $W = \{W_{ij}\}$ is the L×H matrix of the connection weights, F is an H×M matrix comprising the outputs $h_i(n)$ of the processing elements 525, expressed in Equation (3). $\overline{Y(n)}$ may be a corresponding desired output matrix, with an L×M size. Accordingly, in matrix algebra form, connection weight matrix W may be expressed as $$W = \overline{Y} F^+ = \overline{Y} \lim_{\alpha \to 0} F^T (FF^T + \alpha I)^{-1} \qquad (10)$$

where $F^+$ is the pseudo-inverse of F.

In some examples, for example in the context of self-interference calculator 500 implemented as self-interference noise calculator 640, to determine the connection weights $W_{ij}$ for the connections between processing elements 525 and processing elements 535, a training unit 645 may utilize a batch-processing embodiment where sample sets are readily available (e.g., available to be retrieved from a memory). The training unit 645 may randomly initialize the connection weights in the connection weight matrix W. The output vector Y(n) may be computed in accordance with Equation (4). An error term $e_i(n)$ may be computed for each processing element 525, which may be expressed as:

$$e_i(n) = y_i(n) - \widetilde{y}_i(n)(i=1,2,\ldots,L) \qquad (11)$$

where $\widetilde{y}_i(n)$ is a corresponding desired output vector. The connection weights may be adjusted in batch-processing examples in accordance with a machine learning expression where a γ is the learning-rate parameter which could be fixed or time-varying. In the example, the machine learning expression may be:

$$W_{ij}(n+1) + W_{ij}(n) + \gamma e_i(n) f_j(\|X(n) - C_j\|)(i=1,2,\ldots,L;j=1,2,\ldots,M) \qquad (12)$$

Such a process may iterate until passing a specified error threshold. In the example, the total error may be expressed as:

$$\epsilon = \|Y(n) - \overline{Y(n)}\|^2$$

Accordingly, the training unit 645 may iterate recursively the process described herein until the error ϵ passes the specified error threshold, such as passing below the specified error threshold.

In some examples, when the training unit 645 is determining the center vectors $C_1$ that are a non-linear set of vectors fitting a Gaussian function, a scaling factor σ may be used before determination of the connection weights $W_{ij}$ for the connections between processing elements 525 and processing elements 535 of a self-interference calculator 500 implemented as self-interference calculator 640. In a Gaussian function example, a convex hull of the vectors $C_i$ may be used such that the training points allow a smooth fit for the output of the processing elements 525. Accordingly, each center vector $C_i$ may be related to another center vector $C_i$ of the processing elements 525, such that each center vector $C_i$ activates another center vector $C_i$ when computing the connection weights. A scaling factor may be based on heuristic that computes the P-nearest neighbor, such that:

$$\sigma_i = \frac{1}{P} \sum_{j=1}^{P} \|C_j - C_i\|^2 \ (i = 1, 2, \ldots, H)$$

where $C_j$ (for i=1, 2, ..., H) are the P-nearest neighbors of $C_i$.

FIG. 6B is a schematic illustration 650 of an electronic device 655 arranged in accordance with examples described herein. The electronic device 655 includes antennas 101, 103, 105, 107; wireless transmitters 111, 113; power amplifiers 219, 229; wireless receivers 115, 117; compensation components 265, 267; and LNAs 249, 259, which may operate in a similar fashion as described with reference to FIG. 2B. The electronic device 655 also includes the self-interference noise calculator 690 and training unit 685 that may provide sample vectors 680 to the self-interference noise calculator 690. The self-interference noise calculator 500 may be utilized to implement the self-interference noise calculator 690, for example. The training unit 685 may determine center vectors $C_i$ and the connection weights $W_{ij}$, for example, by optimizing the minimized error of adjusted signals (e.g., adjusted signals 530 $y_i(n)$ of FIG. 5A). In the same fashion as described with respect to FIG. 6A, the training unit 685 may determine such center vectors $C_i$ and the connection weights $W_{ij}$ for the electronic device 655.

Figure 7:
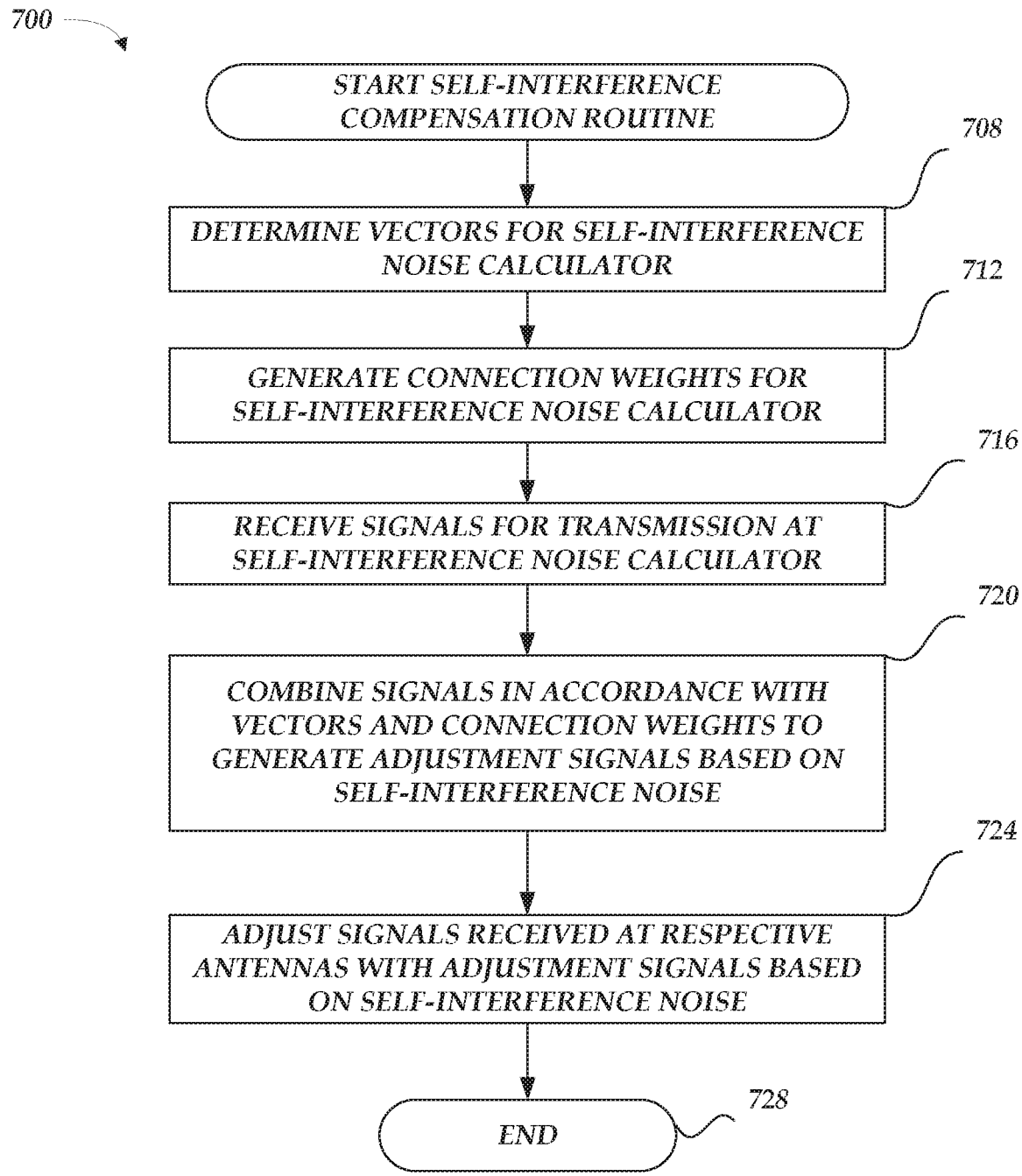
FIG. 7 is a schematic illustration of a full duplex compensation method in accordance with examples described herein.

FIG. 7 is a schematic illustration of a full duplex compensation method 700 in accordance with examples described herein. Example method 700 may be implemented using, for example, electronic device 102, 110 of FIG. 1, electronic device 110 in FIG. 2A, electronic device 270 of FIG. 2B, electronic device 610 of FIG. 6A, electronic device 655 of FIG. 6B, or any system or combination of the systems depicted in the Figures described herein. The operations described in blocks 708-728 may also be stored as computer-executable instructions in a computer-readable medium.

Example method 700 may begin with block 708 that starts execution of the self-interference compensation method and includes determining vectors for self-interference noise calculator. In the example, the center vectors may be determined according a cluster analysis. For example, an error may be minimized such that the distance from the cluster center to a given training point is minimized. Block 708 may be followed by block 712, such that the method further includes generating connection weights for a self-interference noise calculator. In the example, the connection weights may be determined according to a linear least-squares optimization or a batch processing example as described herein. Block 712 may be followed by block 716, such that the method further includes receiving, at a self-interference noise calculator, a signal for transmission. Transmitter output data $x_1(n)$, $x_2(n)$, $x_3(n)$, $x_N(n)$ 510 may be received as input to a self-interference noise calculator. In the example, transmitter output may be a stream of transmission data from a corresponding transmitter that is performing RF operations on corresponding signals to be transmitted.

Block 716 may be followed by block 720, such that the method further includes combining signals in accordance with vectors and connection weights to generate adjustment signals based on self-interference noise. For example, various ALUs, such as multiplication units, in an integrated circuit may be configured to operate as the circuitry of FIG. 5A, thereby combining the transmitter output data $x_1(n)$, $x_2(n)$, $x_3(n)$, $x_N(n)$ 510 to generate adjusted signals $y_1(n)$, $y_2(n)$, $y_3(n)$, $y_L(n)$ 530 as described herein. Block 720 may be followed by a decision block 724, such that the method further includes adjusting signals received at respective antennas with adjustment signals based on self-interference noise. In the example, compensation components 245, 247 may receive the adjusted signals $x_1(n)$, $y_2(n)$ 241, 243 and compensate an incoming received wireless transmission from antennas 105, 107. In the example, the compensation components 245, 247 may subtract the adjusted signals $y_1(n)$, $y_2(n)$ 241, 243 from the received wireless transmission to produce compensated received signals for the respective wireless receivers 115, 117, thereby achieving full duplex compensation. Block 724 may be followed by block 728 that ends the example method 700.

In some examples, the blocks 708 and 712 may be an optional block. For example, determination of the center vectors and the connection weights may occur during a training mode of an electronic device described herein, while the remaining blocks of method 700 may occur during an operation mode of the electronic devices described herein.

The blocks included in the described example method 700 is for illustration purposes. In some embodiments, these blocks may be performed in a different order. In some other embodiments, various blocks may be eliminated. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc.

Figure 8:
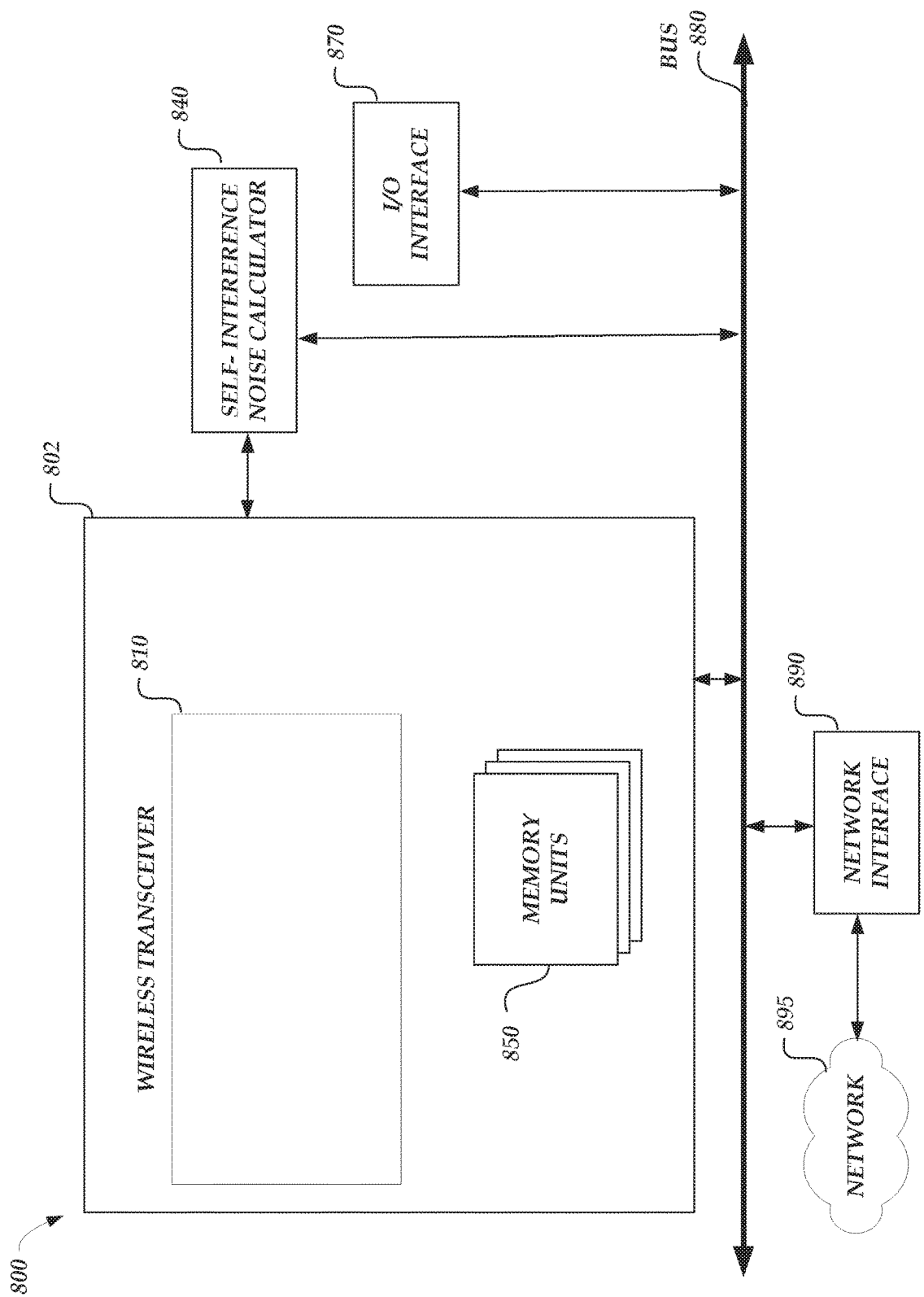
FIG. 8 is a block diagram of a computing device arranged in accordance with examples described herein.

FIG. 8 is a block diagram of an electronic device 800 arranged in accordance with examples described herein. The electronic device 800 may operate in accordance with any example described herein, such as electronic device 102, 110 of FIG. 1, electronic device 110 in FIG. 2A, electronic device 270 of FIG. 2B, electronic device 610 of FIG. 6A, electronic device 655 of FIG. 6B, or any system or combination of the systems depicted in the Figures described herein. The electronic device 800 may be implemented in a smartphone, a wearable electronic device, a server, a computer, an appliance, a vehicle, or any type of electronic device. The electronic device 800 includes a computing system 802, a self-interference noise calculator 840, an I/O interface 870, and a network interface 890 coupled to a network 895. The computing system 802 includes a wireless transceiver 810. The wireless transceiver may include a wireless transmitter and/or wireless receiver, such as wireless transmitter 300 and wireless receiver 400. Self-interference noise calculator 840 may include any type of microprocessor, central processing unit (CPU), an application specific integrated circuits (ASIC), a digital signal processor (DSP) implemented as part of a field-programmable gate array (FPGA), a system-on-chip (SoC), or other hardware to provide processing for device 800.

The computing system 802 includes memory units 850 (e.g., memory look-up unit), which may be non-transitory hardware readable medium including instructions, respectively, for calculating self-interference noise or be memory units for the retrieval, calculation, or storage of data signals to be compensated or adjusted signals based on calculated self-interference noise. The self-interference noise calculator 840 may control the computing system 802 with control instructions that indicate when to execute such stored instructions for calculating self-interference noise or for the retrieval or storage of data signals to be compensated or adjusted signals based on calculated self-interference noise. Upon receiving such control instructions, the wireless transceiver 810 may execute such instructions. For example, such instructions may include a program that executes the method 700. Communications between the self-interference noise calculator 840, the I/O interface 870, and the network interface 890 are provided via an internal bus 880. The self-interference noise calculator 840 may receive control instructions from the I/O interface 870 or the network interface 890, such as instructions to calculate an autocorrelation matrix.

Bus 880 may include one or more physical buses, communication lines/interfaces, and/or point-to-point connections, such as Peripheral Component Interconnect (PCI) bus, a Gen-Z switch, a CCIX interface, or the like. The I/O interface 870 can include various user interfaces including video and/or audio interfaces for the user, such as a tablet display with a microphone. Network interface 890 communications with other electronic devices, such as electronic device 800 or a cloud-electronic server, over the network 895. For example, the network interface 890 may be a USB interface.

Figure 9:
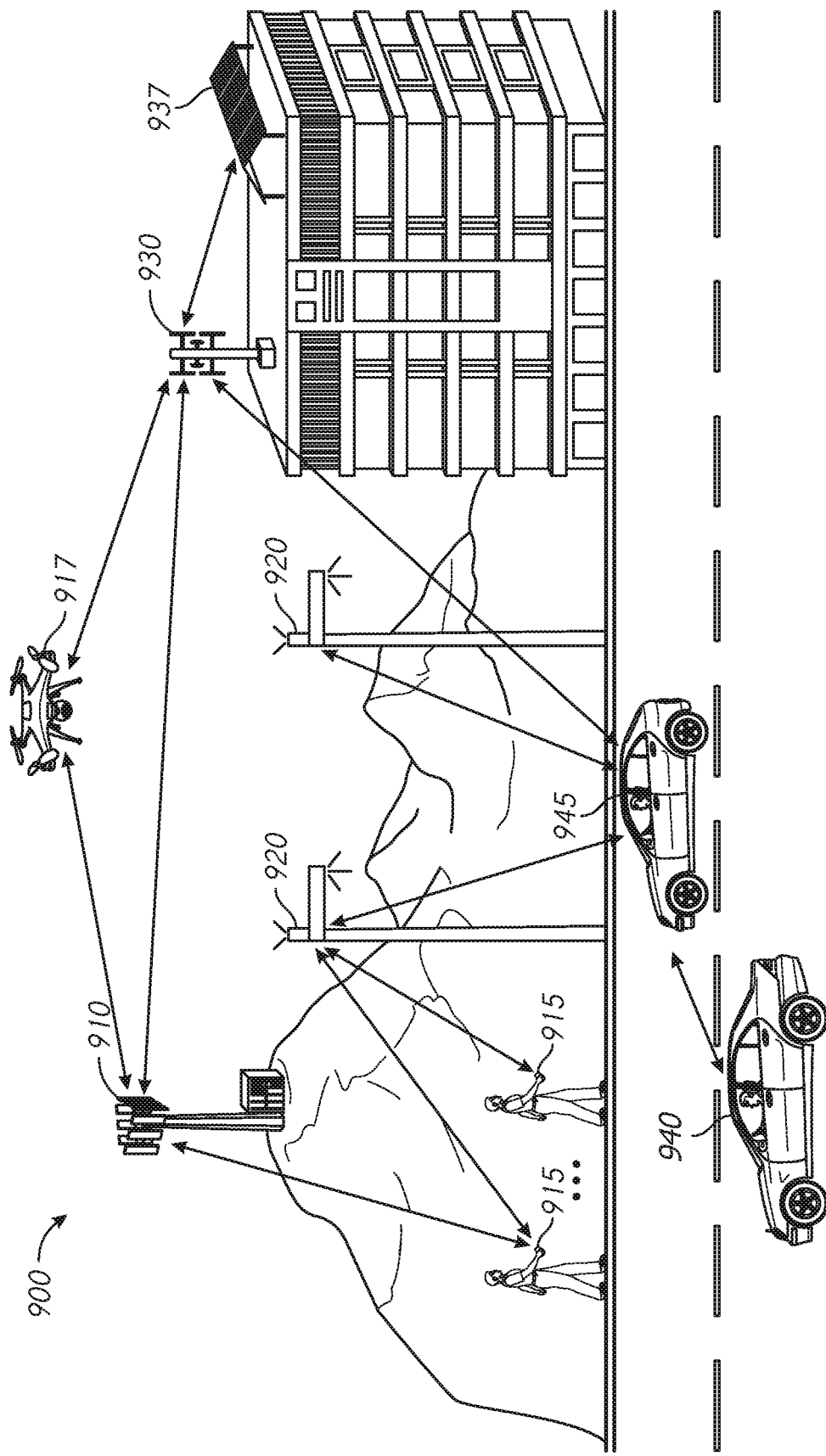
FIG. 9 is a schematic illustration of a wireless communications system arranged in accordance with aspects of the present disclosure.

FIG. 9 illustrates an example of a wireless communications system 900 in accordance with aspects of the present disclosure. The wireless communications system 900 includes a base station 910, a mobile device 915, a drone 917, a small cell 930, and vehicles 940, 945. The base station 910 and small cell 930 may be connected to a network that provides access to the Internet and traditional communication links. The system 900 may facilitate a wide-range of wireless communications connections in a 5G system that may include various frequency bands, including but not limited to: a sub-6 GHz band (e.g., 700 MHz communication frequency), mid-range communication bands (e.g., 2.4 GHz), mmWave bands (e.g., 24 GHz), and a NR band (e.g., 3.5 GHz).

Additionally or alternatively, the wireless communications connections may support various modulation schemes, including hut not limited to: filter bank multi-carrier (FBMC), the generalized frequency division multiplexing (GFDM), universal filtered multi-carrier (UMFC) transmission, bi-orthogonal frequency division multiplexing (BFDM), sparse code multiple access (SCMA), non-orthogonal multiple access (NOMA), multi-user shared access (MUSA), and faster-than-Nyquist (FTN) signaling with time-frequency packing. Such frequency bands and modulation techniques may be a part of a standards framework, such as Long Term Evolution (LTE) 1.8 GHz band) or other technical specification published by an organization like 3GPP or IEEE, which may include various specifications for subcarrier frequency ranges, a number of subcarriers, uplink/downlink transmission speeds, TDD/FDD, and/or other aspects of wireless communication protocols.

The system 900 may depict aspects of a radio access network (RAN), and system 900 may be in communication with or include a core network (not shown). The core network may include one or more serving gateways, mobility management entities, home subscriber servers, and packet data gateways. The core network may facilitate user and control plane links to mobile devices via the RAN, and it may be an interface to an external network (e.g., the Internet). Base stations 910, communication devices 920, and small cells 930 may be coupled with the core network or with one another, or both, via wired or wireless backhaul links (e.g., S1 interface, X2 interface, etc.).

The system 900 may provide communication links connected to devices or "things," such as sensor devices, e.g., solar cells 937, to provide an Internet of Things ("IoT") framework. Connected things within the IoT may operate within frequency bands licensed to and controlled by cellular network service providers, or such devices or things may. Such frequency bands and operation may be referred to as narrowband (NB-IoT) because the frequency bands allocated for IoT operation may be small or narrow relative to the overall system bandwidth. Frequency bands allocated for NB-IoT may have bandwidths of 1, 5, 10, or 20 MHz, for example.

Additionally or alternatively, the IoT may include devices or things operating at different frequencies than traditional cellular technology to facilitate use of the wireless spectrum. For example, an IoT framework may allow multiple devices in system 900 to operate at a sub-6 GHz band or other industrial, scientific, and medical (ISM) radio bands where devices may operate on a shared spectrum for unlicensed uses. The sub-6 GHz band may also be characterized as and may also be characterized as an NB-IoT band. For example, in operating at low frequency ranges, devices providing sensor data for "things," such as solar cells 937, may utilize less energy, resulting in power-efficiency and may utilize less complex signaling frameworks, such that devices may transmit asynchronously on that sub-6 GHz band. The sub-6 GHz band may support a wide variety of uses case, including the communication of sensor data from various sensors devices. Examples of sensor devices include sensors for detecting energy, heat, light, vibration, biological signals (e.g., pulse, EEG, EKG, heart rate, respiratory rate, blood pressure), distance, speed, acceleration, or combinations thereof. Sensor devices may be deployed on buildings, individuals, and/or in other locations in the environment. The sensor devices may communicate with one another and with computing systems which may aggregate and/or analyze the data provided from one or multiple sensor devices in the environment.

In such a 5G framework, devices may perform functionalities performed by base stations in other mobile networks (e.g., UMTS or LTE), such as forming a connection or managing mobility operations between nodes (e.g., handoff or reselection). For example, mobile device 915 may receive sensor data from the user utilizing the mobile device 915, such as blood pressure data, and may transmit that sensor data on a narrowband IoT frequency band to base station 910. In such an example, some parameters for the determination by the mobile device 915 may include availability of licensed spectrum, availability of unlicensed spectrum, and/or time-sensitive nature of sensor data. Continuing in the example, mobile device 915 may transmit the blood pressure data because a narrowband IoT band is available and can transmit the sensor data quickly, identifying a time-sensitive component to the blood pressure if the blood pressure measurement is dangerously high or low, such as systolic blood pressure is three standard deviations from norm).

Additionally or alternatively, mobile device 915 may form device-to-device (D2D) connections with other mobile devices or other elements of the system 900. For example, the mobile device 915 may form RFID, WiFi, Bluetooth, or Zigbee connections with other devices, including communication device 920 or vehicle 945. In some examples, D2D connections may be made using licensed spectrum bands, and such connections may be managed by a cellular network or service provider. Accordingly, while the above example was described in the context of narrowband IoT, it can be appreciated that other device-to-device connections may be utilized by mobile device 915 to provide information (e.g., sensor data) collected on different frequency bands than a frequency band determined by mobile device 915 for transmission of that information.

Moreover, some communication devices may facilitate ad-hoc networks, for example, a network being formed with communication devices 920 attached to stationary objects and the vehicles 940, 945, without a traditional connection to a base station 910 and/or a core network necessarily being formed. Other stationary objects may be used to support communication devices 920, such as, but not limited to, trees, plants, posts, buildings, blimps, dirigibles, balloons, street signs, mailboxes, or combinations thereof. In such a system 900, communication devices 920 and small cell 930 (e.g., a small cell, femtocell, WLAN access point, cellular hotspot, etc.) may be mounted upon or adhered to another structure, such as lampposts and buildings to facilitate the formation of ad-hoc networks and other IoT-based networks. Such networks may operate at different frequency bands than existing technologies, such as mobile device 915 communicating with base station 910 on a cellular communication band.

The communication devices 920 may form wireless networks, operating in either a hierarchal or ad-hoc network fashion, depending, in part, on the connection to another element of the system 900. For example, the communication devices 920 may utilize a 700 MHz communication frequency to form a connection with the mobile device 915 in an unlicensed spectrum, while utilizing a licensed spectrum communication frequency to form another connection with the vehicle 945. Communication devices 920 may communicate with vehicle 945 on a licensed spectrum to provide direct access for time-sensitive data, for example, data for an autonomous driving capability of the vehicle 945 on a 5.9 GHz band of Dedicated Short Range Communications (DSRC).

Vehicles 940 and 945 may form an ad-hoc network at a different frequency band than the connection between the communication device 920 and the vehicle 945. For example, for a high bandwidth connection to provide time-sensitive data between vehicles 940, 945, a 24 GHz mmWave band may be utilized for transmissions of data between vehicles 940, 945. For example, vehicles 940, 945 may share real-time directional and navigation data with each other over the connection while the vehicles 940, 945 pass each other across a narrow intersection line. Each vehicle 940, 945 may be tracking the intersection line and providing image data to an image processing algorithm to facilitate autonomous navigation of each vehicle while each travels along the intersection line. In some examples, this real-time data may also be substantially simultaneously shared over an exclusive, licensed spectrum connection between the communication device 920 and the vehicle 945, for example, for processing of image data received at both vehicle 945 and vehicle 940, as transmitted by the vehicle 940 to vehicle 945 over the 24 GHz mmWave band. While shown as automobiles in FIG. 9, other vehicles may be used including, but not limited to, aircraft, spacecraft, balloons, blimps, dirigibles, trains, submarines, boats, ferries, cruise ships, helicopters, motorcycles, bicycles, drones, or combinations thereof.

While described in the context of a 24 GHz mmWave band, it can be appreciated that connections may be formed in the system 900 in other mmWave bands or other frequency bands, such as 28 GHz, 37 GHz, 38 GHz, 39 GHz, which may be licensed or unlicensed bands. In some cases, vehicles 940, 945 may share the frequency band that they are communicating on with other vehicles in a different network. For example, a fleet of vehicles may pass vehicle 940 and, temporarily, share the 24 GHz mmWave band to form connections among that fleet, in addition to the 24 GHz mmWave connection between vehicles 940, 945. As another example, communication device 920 may substantially simultaneously maintain a 700 MHz connection with the mobile device 915 operated by a user (e.g., a pedestrian walking along the street) to provide information regarding a location of the user to the vehicle 945 over the 5.9 GHz band. In providing such information, communication device 920 may leverage antenna diversity schemes as part of a massive MIMO framework to facilitate time-sensitive, separate connections with both the mobile device 915 and the vehicle 945. A massive MIMO framework may involve a transmitting and/or receiving devices with a large number of antennas (e.g., 12, 20, 64, 128, etc.), which may facilitate precise beamforming or spatial diversity unattainable with devices operating with fewer antennas according to legacy protocols (e.g., WiFi or LTE).

The base station 910 and small cell 930 may wirelessly communicate with devices in the system 900 or other communication-capable devices in the system 900 having at the least a sensor wireless network, such as solar cells 937 that may operate on an active sleep cycle, and/or one or more other sensor devices. The base station 910 may provide wireless communications coverage for devices that enter its coverages area, such as the mobile device 915 and the drone 917. The small cell 930 may provide wireless communications coverage for devices that enter its coverage area, such as near the building that the small cell 930 is mounted upon, such as vehicle 945 and drone 917.

Generally, a small cell 930 may be referred to as a small cell and provide coverage for a local geographic region, for example, coverage of 200 meters or less in some examples. This may contrasted with at macrocell, which may provide coverage over a wide or large area on the order of several square miles or kilometers. In some examples, a small cell 930 may be deployed (e.g., mounted on a building) within some coverage areas of a base station 910 (e.g., a macrocell) where wireless communications traffic may be dense according to a traffic analysis of that coverage area. For example, a small cell 930 may be deployed on the building in FIG. 9 in the coverage area of the base station 910 if the base station 910 generally receives and/or transmits a higher amount of wireless communication transmissions than other coverage areas of that base station 910. A base station 910 may be deployed in a geographic area to provide wireless coverage for portions of that geographic area. As wireless communications traffic becomes more dense, additional base stations 910 may be deployed in certain areas, which may alter the coverage area of an existing base station 910, or other support stations may be deployed, such as a small cell 930. Small cell 930 may be a femtocell, which may provide coverage for an area smaller than a small cell (e.g., 100 meters or less in some examples (e.g., one story of a building)).

While base station 910 and small cell 930 may provide communication coverage for a portion of the geographical area surrounding their respective areas, both may change aspects of their coverage to facilitate faster wireless connections for certain devices. For example, the small cell 930 may primarily provide coverage for devices surrounding or in the building upon which the small cell 930 is mounted. However, the small cell 930 may also detect that a device has entered is coverage area and adjust its coverage area to facilitate a faster connection to that device.

For example, a small cell 930 may support a massive MIMO connection with the drone 917, which may also be referred to as an unmanned aerial vehicle (UAV), and, when the vehicle 945 enters it coverage area, the small cell 930 adjusts some antennas to point directionally in a direction of the vehicle 945, rather than the drone 917, to facilitate a massive MIMO connection with the vehicle, in addition to the drone 917. In adjusting some of the antennas, the small cell 930 may not support as fast as a connection to the drone 917 at a certain frequency, as it had before the adjustment. For example, the small cell 930 may be communicating with the drone 917 on a first frequency of various possible frequencies in a 4G LTE band of 1.8 GHz. However, the drone 917 may also request a connection at a different frequency with another device (e.g., base station 910) in its coverage area that may facilitate a similar connection as described with reference to the small cell 930, or a different (e.g., faster, more reliable) connection with the base station 910, for example, at a 3.5 GHz frequency in the 5G NR band. Accordingly, the system 900 may enhance existing communication links in providing additional connections to devices that may utilize or demand such links, while also compensating for any self-interference noise generated by the drone 917 in transmitting, for example, in both the 4GE LIE and 5G NR bands. In some examples, drone 917 may serve as a movable or aerial base station.

The wireless communications system 900 may include devices such as base station 910, communication device 920, and small cell 930 that may support several connections at varying frequencies to devices in the system 900, while also compensating for self-interference noise utilizing self-interference noise calculators, such as self-interference noise calculator 500. Such devices may operate in a hierarchal mode or an ad-hoc mode with other devices in the network of system 900. While described in the context of a base station 910, communication device 920, and small cell 930, it can be appreciated that other devices that can support several connections with devices in the network, while also compensating for self-interference noise utilizing self-interference noise calculators, may be included in system 900, including but not limited to: macrocells, femtocells, routers, satellites, and RFID detectors.

In various examples, the elements of wireless communication system 900, such as base station 910, a mobile device 915, a drone 917, communication device 920 a small cell 930, and vehicles 940, 945, may be implemented as an electronic device described herein that compensate for self-interference noise utilizing self-interference noise calculators. For example, the communication device 920 may be implemented as electronic devices described herein, such as electronic device 102, 110 of FIG. 1, electronic device 110 in FIG. 2A, electronic device 270 of FIG. 213, electronic device 610 of FIG. 6A, electronic device 655 of FIG. 6B, or any system or combination of the systems depicted in the Figures described herein.

Figure 10:
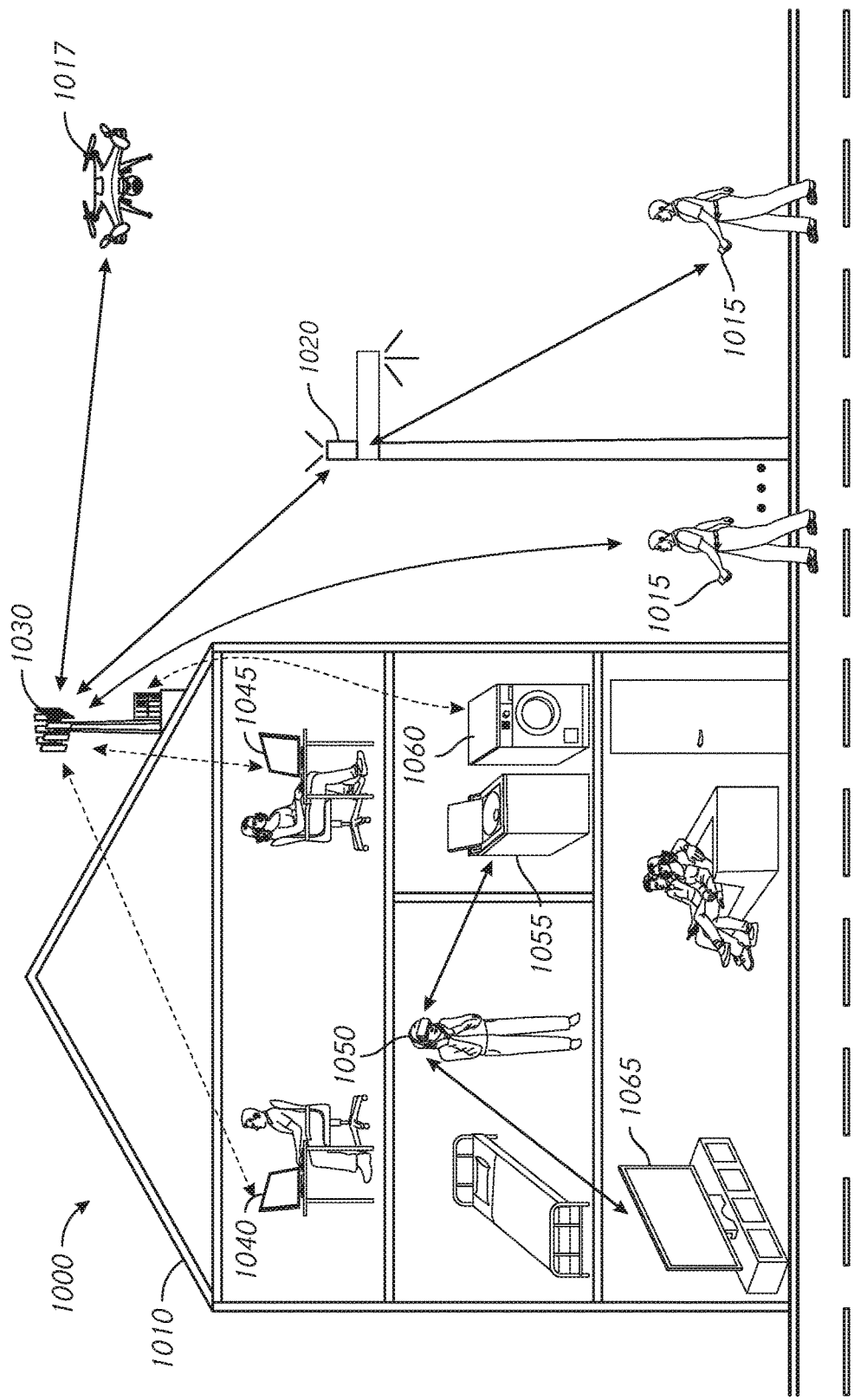
FIG. 10 is a schematic illustration of a wireless communications system arranged in accordance with aspects of the present disclosure.

FIG. 10 illustrates an example of a wireless communications system 1000 in accordance with aspects of the present disclosure. The wireless communications system 1000 includes a mobile device 1015, a drone 1017, a communication device 1020, and a small cell 1030. A building 1010 also includes devices of the wireless communication system 1000 that may be configured to communicate with other elements in the building 1010 or the small cell 1030. The building 1010 includes networked workstations 1040, 1045, virtual reality device 1050, IoT devices 1055, 1060, and networked entertainment device 1065. In the depicted system 1000, IoT devices 1055, 1060 may be a washer and dryer, respectively, for residential use, being controlled by the virtual reality device 1050. Accordingly, while the user of the virtual reality device 1050 may be in different room of the building 1010, the user may control an operation of the IoT device 1055, such as configuring a washing machine setting. Virtual reality device 1050 may also control the networked entertainment device 1065. For example, virtual reality device 1050 may broadcast a virtual game being played by a user of the virtual reality device 1050 onto a display of the networked entertainment device 1065.

The small cell 1030 or any of the devices of building 1010 may be connected to a network that provides access to the Internet and traditional communication links. Like the system 900, the system 1000 may facilitate a wide-range of wireless communications connections in a 5G system that may include various frequency bands, including but not limited to: a sub-6 GHz band (e.g., 700 MHz communication frequency), mid-range communication bands (e.g., 2.4 GHz), and mmWave bands (e.g., 24 GHz). Additionally or alternatively, the wireless communications connections may support various modulation schemes as described above with reference to system 900. System 1000 may operate and be configured to communicate analogously to system 900. Accordingly, similarly numbered elements of system 1000 and system 900 may be configured in an analogous way, such as communication device 920 to communication device, small cell 930 to small cell 1030, etc. . . . . .

Like the system 900, where elements of system 900 are configured to form independent hierarchal or ad-hoc networks, communication device 920 may form a hierarchal network with small cell 1030 and mobile device 1015, while an additional ad-hoc network may be formed among the small cell 1030 network that includes drone 1017 and some of the devices of the building 1010, such as networked workstations 1040, 1045 and IoT devices 1055, 1060.

Devices in communication system 1000 may also form (D2D) connections with other mobile devices or other elements of the system 1000. For example, the virtual reality device 1050 may form a narrowband IoT connections with other devices, including IoT device 1055 and networked entertainment device 1065. As described above, in some examples, D2D connections may be made using licensed spectrum bands, and such connections may be managed by a cellular network or service provider. Accordingly, while the above example was described in the context of a narrowband IoT, it can be appreciated that other device-to-device connections may be utilized by virtual reality device 1050.

In various examples, the elements of wireless communication system 1000, such as the mobile device 1015, the drone 1017, the communication device 1020, and the small cell 1030, the networked workstations 1040, 1045, the virtual reality device 1050, the IoT devices 1055, 1060, and the networked entertainment device 1065, may be implemented as electronic devices described herein that compensate for self-interference noise utilizing self-interference noise calculators. For example, the communication device 1020 may be implemented as electronic devices described herein, such as electronic device 102, 110 of FIG. 1, electronic device 110 in FIG. 2A, electronic device 270 of FIG. 2B, electronic device 610 of FIG. 6A, electronic device 655 of FIG. 6B, or any system or combination of the systems depicted in the Figures described herein.

Certain details are set forth above to provide a sufficient understanding of described examples. However, it will be clear to one skilled in the art that examples may be practiced without various of these particular details. The description herein, in connection with the appended drawings, describes example configurations and does not represent all the examples that may be implemented or that are within the scope of the claims. The terms "exemplary" and "example" as may be used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Techniques described herein may be used for various wireless communications systems, which may include multiple access cellular communication systems, and which may employ code division multiple access (CDMA), time division multiple access (TDMA), frequency division multiple access (FDMA), orthogonal frequency division multiple access (OFDMA), or single carrier frequency division multiple access (SC-FDMA), or any a combination of such techniques. Some of these techniques have been adopted in or relate to standardized wireless communication protocols by organizations such as Third Generation Partnership Project (3GPP), Third Generation Partnership Project 2 (3GPP2) and IEEE. These wireless standards include Ultra Mobile Broadband (UMB), Universal Mobile Telecommunications System (UMTS), Long Term Evolution (LTE), LTE-Advanced (LTE-A), LTE-A Pro, New Radio (NR), IEEE 802.11 (WiFi), and IEEE 802.16 (WiMAX), among others.

The terms "5G" or "5G communications system" may refer to systems that operate according to standardized protocols developed or discussed after, for example, LTE Releases 13 or 14 or WiMAX 802.16e-2005 by their respective sponsoring organizations. The features described herein may be employed in systems configured according to other generations of wireless communication systems, including those configured according to the standards described above.

The various illustrative blocks and modules described in connection with the disclosure herein may be implemented or performed with a general-purpose processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above are also included within the scope of computer-readable media.

Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing it will be appreciated that, although specific examples have been described herein for purposes of illustration, various modifications may be made while remaining with the scope of the claimed technology. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:
1. A method comprising:
generating, at first and second power amplifiers, first and second amplified signals based on first and second transmit signals;

providing, from the first power amplifier to a self-interference noise calculator, a first amplified signal associated with a first frequency;
providing, from the second power amplifier to the self-interference noise calculator, a second amplified signal associated with a second frequency;
processing the first and second amplified signals in accordance with a plurality of vectors and a plurality of connection weights to generate a plurality of adjustment signals based on at least self-interference noise of a corresponding path from a first antenna of a plurality of antennas to at least a second antenna of the plurality of antennas, the self-interference noise associated with the first amplified signal; and
adjusting a first received signal and a second received signal received at respective antennas of the plurality of antennas with a corresponding adjustment signal of the plurality of adjustment signals, wherein adjusting the first received signal and the second received signal received at respective antennas of the plurality of antennas with the corresponding adjustment signal comprises:
subtracting the corresponding adjustment signal from the first received signal and the second received signal to generate respective compensated received signals.

2. The method of claim 1, wherein the adjustment signals of the plurality are based on the self-interference noise of the corresponding path from the first antenna to the second antenna and another corresponding path from the first antenna to a third antenna of the plurality of antennas, the second antenna associated with the first frequency and the third antenna associated with second frequency.

3. The method of claim 1, further comprising:
transmitting, from the first antenna of the plurality of antennas during a time interval, the first amplified signal associated with the first frequency;
transmitting, from a third antenna of the plurality of antennas during the time interval, the second amplified signal associated with the second frequency; and
receiving, at the second antenna of the plurality of antennas during the time interval, the first received signal associated with the second frequency.

4. The method of claim 3, further comprising:
receiving, at a fourth antenna of the plurality of antennas during the time interval, the second received signal associated with the first frequency.

5. The method of claim 3, wherein the first frequency interferes with the second frequency.

6. The method of claim 1, further comprising:
determining the plurality of vectors for the self-interference noise calculator, each vector representative of self-interference of a corresponding path from the first antenna to other antennas of the plurality of antennas; and
generating the plurality of connection weights for a corresponding connection between layers of the self-interference noise calculator.

7. The method of claim 6, wherein determining the plurality of vectors for the self-interference noise calculator comprises:
selecting a set of vectors based on at least one of a Gaussian function, a multi-quadratic function, an inverse multi-quadratic function, a thin-plate spine function, a piece-wise linear function, or a cubic approximation function.

8. The method of claim 6, wherein determining the plurality of vectors for the self-interference noise calculator comprises:
determining a set of sample vectors;
assigning a respective set of training points to each sample vector; and
minimizing error of the adjustment signals based on a computation of each sample vector with the respective set of training points to determine the plurality of vectors.

9. The method of claim 6, wherein generating the plurality of connection weights for the corresponding connection of the self-interference noise calculator comprises:
randomly selecting the plurality of connection weights;
minimizing an error of the adjustment signals based on a summation of the plurality of connection weights.

10. The method of claim 1, wherein the first frequency corresponds to 3.5 GHz in the 5G New Radio (NR) band, and the second frequency corresponds to 1.8 GHz in the 4G Long-Term Evolution (LTE) band.

11. The method of claim 1, further comprising:
receiving, at the self-interference noise calculator, the first and second amplified signals from the first and second power amplifiers, respectively, and wherein, responsive to receiving the first and second amplified signals, processing the first and second amplified signals in accordance with the plurality of vectors and the plurality of connection weights.

12. An apparatus comprising:
a plurality of antennas;
a first wireless transmitter configured to transmit a first amplified signal at a first frequency from a first antenna of the plurality of antennas;
a second wireless transmitter configured to transmit a second amplified signal at a second frequency from a second antenna of the plurality of antennas;
a first wireless receiver configured to receive a first received signal at the first frequency from a third antenna of the plurality of antennas;
a second wireless receiver configured to receive a second received signal at the second frequency from a fourth antenna of the plurality of antennas;
a self-interference noise calculator coupled to the plurality of antennas, the self-interference noise calculator configured to generate a plurality of adjusted signals, the self-interference noise calculator comprising:
a network of processing elements configured to combine at least the first amplified signal and the second amplified signal to generate a corresponding adjusted signal of the plurality of adjusted signals; and
wherein the first wireless receiver is configured to receive a first adjusted signal of the plurality of adjusted signals, and wherein the second wireless receiver is configured to receive a second adjusted signal of the plurality of adjusted signals; and
a plurality of compensation components including a first compensation component and a second compensation component, wherein the first compensation component of the plurality of compensation components is configured to subtract the first adjusted signal of the plurality of adjusted signals from the first received signal to generate a first compensated received signal, and wherein the second compensation component of the plurality of compensation components is configured to subtract the second adjusted signal of the plurality of adjusted signals from the second received signal to generate a second compensated received signal.

13. The apparatus of claim 12, further comprising:
a first power amplifier coupled between the first wireless transmitter and the first antenna; and
a second power amplifier coupled between the second wireless transmitter and the second antenna.

14. The apparatus of claim 13, wherein the plurality of adjusted signals compensate for nonlinear power amplifier noise associated with the first power amplifier and the second power amplifier.

15. The apparatus of claim 12, wherein the first frequency corresponds to 3.5 GHz in the 5G New Radio (NR) band, and the second frequency corresponds to 1.8 GHz in the 4G Long-Term Evolution (LTE) band.

16. The apparatus of claim 12, wherein the self-interference noise calculator is further configured to receive the first amplified signal and the second amplified signals.

17. An apparatus comprising:
a plurality of antennas;
a first wireless transmitter configured to transmit a first amplified signal at a first frequency from a first antenna of the plurality of antennas;
a second wireless transmitter configured to transmit a second amplified signal at a second frequency from a second antenna of the plurality of antennas;
a first wireless receiver configured to receive a first received signal at the first frequency from a third antenna of the plurality of antennas;
a second wireless receiver configured to receive a second received signal at the second frequency from a fourth antenna of the plurality of antennas;
a self-interference noise calculator coupled to the plurality of antennas, the self-interference noise calculator configured to generate a plurality of adjusted signals, the self-interference noise calculator comprising:
a network of processing elements configured to combine at least the first amplified signal and the second amplified signal to generate a corresponding adjusted signal of the plurality of adjusted signals;
wherein the first wireless receiver is configured to receive a first adjusted signal of the plurality of adjusted signals, and wherein the second wireless receiver is configured to receive a second adjusted signal of the plurality of adjusted signals;
a plurality of compensation components comprising:
a first compensation component of the plurality of compensation components coupled to the third antenna and configured to generate a first compensated received signal based partly on the first adjusted signal; and
a second compensation component of the plurality of compensation components coupled to the fourth antenna and configured to generate a second compensated received signal based partly on the second adjusted signal;
a first low-noise amplifier coupled to the first compensation component and configured to receive the first compensated received signal; and
a second low-noise amplifier coupled to the second compensation component and configured to receive the second compensated received signal.

18. The apparatus of claim 17, wherein the self-interference noise calculator is configured to transmit a corresponding adjustment signal to a respective compensation component.

19. The apparatus of claim 18, wherein each compensation component is configured to subtract a respective adjusted signal from a respective received signal to generate the respective compensated received signal.

20. An apparatus comprising:
a plurality of antennas;
a first wireless transmitter configured to transmit a first amplified signal at a first frequency from a first antenna of the plurality of antennas;
a second wireless transmitter configured to transmit a second amplified signal at a second frequency from a second antenna of the plurality of antennas;
a first wireless receiver configured to receive a first received signal first frequency from a third antenna of the plurality of antennas;
a second wireless receiver configured to receive a second received signal at the second frequency from a fourth antenna of the plurality of antennas;
a self-interference noise calculator coupled to the plurality of antennas, the self-interference noise calculator configured to generate a plurality of adjusted signals, the self-interference noise calculator comprising:
a network of processing elements configured to combine at least the first amplified signal and the second amplified signal to generate a corresponding adjusted signal of the plurality of adjusted signals;
wherein the first wireless receiver is configured to receive a first adjusted signal of the plurality of adjusted signals, and wherein the second wireless receiver is configured to receive a second adjusted signal of the plurality of adjusted signals; and
a plurality of compensation components comprising:
a first compensation component of the plurality of compensation components coupled to an input of the first wireless receiver and configured to generate a first compensated received signal based at least in part on the first adjusted signal; and
a second compensation component of the plurality of compensation components coupled to an input of the second wireless receiver and configured to generate a second compensated received signal based at least in part on the second adjusted signal.

21. An apparatus comprising:
a plurality of antennas;
a first wireless transmitter configured to transmit a first amplified signal at a first frequency from a first antenna of the plurality of antennas;
a second wireless transmitter configured to transmit a second amplified signal at a second frequency from a second antenna of the plurality of antennas;
a first wireless receiver configured to receive a first received signal at the first frequency from a third antenna of the plurality of antennas;
a second wireless receiver configured to receive a second received signal at the second frequency from a fourth antenna of the plurality of antennas;
a self-interference noise calculator coupled to the plurality of antennas, the self-interference noise calculator configured to generate a plurality of adjusted signals, the self-interference noise calculator comprising:
a network of processing elements configured to combine at least the first amplified signal and the second amplified signal to generate a corresponding adjusted signal of the plurality of adjusted signals;
wherein the first wireless receiver is configured to receive a first adjusted signal of the plurality of adjusted signals, and wherein the second wireless receiver is configured to receive a second adjusted signal of the plurality of adjusted signals, wherein the network of processing elements is configured to combine at least the first amplified signal and the second amplified signal into a plurality of sets of intermediate results; wherein the network of processing elements is further configured to sum each set of intermediate results to generate a corresponding adjusted signal of the plurality of adjusted signals.

22. An apparatus comprising:
a plurality of power amplifiers configured to receive respective transmit signals and to amplify the transmit signals to generate respective amplified signals;
a plurality of antennas, each antenna configured to transmit a respective amplified signal; and
a self-interference noise calculator coupled to each antenna of the plurality of antennas coupled to each power amplifier of the plurality of power amplifiers, the self-interference noise calculator configured to receive the respective amplified signals from respective power amplifiers of the plurality of power amplifiers, the self-interference noise calculator comprising:
  a plurality of multiplication processing units, each multiplication processing unit configured to generate a plurality of noise processing results based on the respective amplified signal; and
  a plurality of accumulation processing units, each accumulation processing unit configured to generate a respective adjustment signal of a plurality of adjustment signals based on each noise processing result,
wherein a first power amplifier of the plurality of power amplifiers is configured to amplify a first transmit signal associated with a first frequency and to generate a first amplified signal comprising first amplifier noise associated with the first frequency, and wherein a second power amplifier of the plurality of power amplifiers is configured to amplify a second transmit signal associated with a second frequency and to generate a second amplified signal comprising second amplifier noise associated with the second frequency.

23. The apparatus of claim 22, wherein the self-interference noise calculator is configured to generate weighted connections that couple one of the multiplication processing units to one of the accumulation processing units.

24. The apparatus of claim 23, wherein each weighted connection comprises a respective weight for the weighted connection based on a minimized error for the plurality of adjustment signals.

* * * * *